US012665525B2

(12) United States Patent
Wang et al.

(10) Patent No.: US 12,665,525 B2
(45) Date of Patent: Jun. 23, 2026

(54) MULTI-LEVEL CONVERSION CIRCUIT AND CYCLE-BY-CYCLE PROTECTION METHOD THEREFOR

(71) Applicant: Delta Electronics (Shanghai) Co., Ltd., Shanghai (CN)

(72) Inventors: Yichao Wang, Shanghai (CN); Yuhua Hu, Shanghai (CN); Lu Wang, Shanghai (CN); Kai Dong, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 171 days.

(21) Appl. No.: 18/778,691

(22) Filed: Jul. 19, 2024

(65) Prior Publication Data

US 2025/0080008 A1     Mar. 6, 2025

(30) Foreign Application Priority Data

Aug. 28, 2023     (CN) .......................... 202311092668.9

(51) Int. Cl.
| | |
|---|---|
| *H02M 7/483* | (2007.01) |
| *H02M 1/00* | (2007.01) |
| *H02M 1/10* | (2006.01) |
| *H02M 1/32* | (2007.01) |

(Continued)

(52) U.S. Cl.
CPC ....... *H02M 7/4837* (2021.05); *H02M 1/0095* (2021.05); *H02M 1/10* (2013.01); *H02M 1/32* (2013.01); *H02M 3/07* (2013.01); *H02M 3/158* (2013.01)

(58) Field of Classification Search
CPC ........ H02M 1/0095; H02M 1/10; H02M 1/32; H02M 3/07–078; H02M 3/155–1588; H02M 7/4837
See application file for complete search history.

(56) References Cited

U.S. PATENT DOCUMENTS

| | | | |
|---|---|---|---|
| 10,468,988 B2 | 11/2019 | Scoones et al. | |
| 11,101,735 B2 | 8/2021 | Scoones et al. | |
| 2023/0021124 A1* | 1/2023 | Dong ................. | H02M 1/0095 |

(Continued)

FOREIGN PATENT DOCUMENTS

| | | |
|---|---|---|
| CN | 113241938 A | 8/2021 |
| CN | 115473417 A | 12/2022 |

*Primary Examiner* — Fred E Finch, III
(74) *Attorney, Agent, or Firm* — KIRTON McCONKIE; Evan R. Witt

(57) ABSTRACT

A multi-level conversion circuit and a cycle-by-cycle protection method therefor are provided. The cycle-by-cycle protection method includes steps of: (a) determining main switches and synchronous rectification switches; (b) controlling the main switches to operate in a normal mode; (c) detecting a current flowing through the inductor, and determining whether the current exceeds a threshold; (d) when the current exceeds the threshold, defining the main switch in an on state as a target main switch, switching the target main switch to a current limiting mode for turning off the target main switch; and (e) after the target main switch is switched to the current limiting mode, if the current is lower than the threshold, at a moment when a falling edge of control signals in a reference mode for the main switches first appears, switching the target main switch to a state in the reference mode corresponding to the moment.

10 Claims, 30 Drawing Sheets

(51) Int. Cl.
    H02M 3/07          (2006.01)
    H02M 3/158        (2006.01)

(56)                 References Cited

U.S. PATENT DOCUMENTS

| | | | |
|---|---|---|---|
| 2023/0136027 A1 | 5/2023 | Szczeszynski | |
| 2024/0258925 A1* | 8/2024 | Tang | H02M 3/1582 |
| 2024/0305194 A1* | 9/2024 | Anderson | H02M 1/0095 |
| 2025/0079973 A1* | 3/2025 | Wang | H02M 1/0095 |
| 2025/0079974 A1* | 3/2025 | Hu | H02M 7/25 |

* cited by examiner

1

MULTI-LEVEL CONVERSION CIRCUIT AND CYCLE-BY-CYCLE PROTECTION METHOD THEREFOR

CROSS-REFERENCE TO RELATED APPLICATION

This application claims priority to China Patent Application No. 202311092668.9, filed on Aug. 28, 2023, the entire contents of which are incorporated herein by reference for all purposes.

FIELD OF THE INVENTION

The present disclosure relates to a multi-level conversion circuit and a cycle-by-cycle protection method therefor, and more particularly to a flying capacitor multi-level conversion circuit and a cycle-by-cycle protection method therefor.

BACKGROUND OF THE INVENTION

In a multi-level conversion circuit with flying capacitors, if the inductor current has a peak or an extremely large value, the circuit may be damaged. Hence, the cycle-by-cycle current limiting is adopted to ensure that the inductor current would not exceed the set value at any moment.

In the conventional approach of cycle-by-cycle current limiting, when the inductor current is greater than a set value, the control signal of the main switch is blocked (i.e., turning off the main switch) to reduce the inductor current. FIG. 1 exemplifies the waveforms of the control signal of the main switch and the inductor current of a conventional two-level conversion circuit. In FIG. 1, the dashed line depicts the waveform of the circuit operating in the normal mode, and the solid line depicts the waveform during applying cycle-by-cycle current limiting. As shown in FIG. 1, when the cycle-by-cycle current limiting is applied, if the inductor current is detected to be greater than the set value, the control signal of the main switch is blocked until the end of the present switching cycle. It should be noted that no additional adjustment or restart is performed on the control signal between the timing of blocking the control signal and the end of the present switching cycle.

However, when the number of levels is large, the conventional approach of cycle-by-cycle current limiting may cause the inductor current to have large current fluctuation. For example, FIG. 2 exemplifies the waveforms of the control signals of main switches and the inductor current of a conventional flying capacitor three-level conversion circuit. As shown in FIG. 2, since the time for decreasing the inductor current is too long, the characteristic that two cycles of inductor current is included in one single switching cycle is not maintained, and also a large current fluctuation is generated. Such large current fluctuation may increase the losses and even cause a deviation in the voltage across the flying capacitor.

Therefore, there is a need of providing a multi-level conversion circuit and a cycle-by-cycle protection method therefor in order to overcome the drawbacks of the conventional technologies.

SUMMARY OF THE INVENTION

The present disclosure provides a multi-level conversion circuit and a cycle-by-cycle protection method therefor in which the inductor current is maintained to not exceed a threshold and the excessive fluctuation in the inductor current is avoided at the same time.

In accordance with an aspect of the present disclosure, a cycle-by-cycle protection method for a multi-level conversion circuit is provided. The number of levels of the multi-level conversion circuit equals N which is an integer greater than or equal to 3. The multi-level conversion circuit includes a first input terminal, a second input terminal, a first output terminal, and a second output terminal, an inductor, N–1 lower switches, N–1 upper switches, and N–2 flying capacitors. The first input terminal and the second input terminal are configured to receive an input voltage, and the first output terminal and the second output terminal are configured to provide an output voltage. The first input terminal is electrically connected to the second output terminal when a potential at the first input terminal is lower than a potential at the second input terminal, and the first input terminal is electrically connected to the first output terminal when the potential at the first input terminal is higher than the potential at the second input terminal. A first terminal of the inductor is electrically connected to the second input terminal. The N–1 lower switches are electrically connected in series between a second terminal of the inductor and the second output terminal, and the first lower switch and the N–1$^{th}$ lower switch are electrically coupled to the second terminal of the inductor and the second output terminal respectively. The N–1 upper switches are electrically connected in series between the second terminal of the inductor and the first output terminal, and the first upper switch and the N–1$^{th}$ upper switch are electrically coupled to the second terminal of the inductor and the first output terminal respectively. The k$^{th}$ flying capacitor is connected between a common connection node of the k$^{th}$ lower switch and the k+1$^{th}$ lower switch and a common connection node of the k$^{th}$ upper switch and the k+1$^{th}$ upper switch, and k is a positive integer less than or equal to N–2. The cycle-by-cycle protection method includes steps of: (a) when the potential at the first input terminal is lower than the potential at the second input terminal, operating the N–1 lower switches and the N–1 upper switches as N–1 main switches and N–1 synchronous rectification switches respectively, and when the potential at the first input terminal is higher than the potential at the second input terminal, operating the N–1 lower switches and the N–1 upper switches as N–1 synchronous rectification switches and N–1 main switches respectively; (b) controlling the N–1 main switches to operate in a normal mode, wherein in the normal mode, control signals of the i$^{th}$ lower switch and the i$^{th}$ upper switch are complementary, and i is a positive integer less than or equal to N–1; (c) detecting a current flowing through the inductor, and determining whether the current exceeds a threshold; (d) if a duty ratio of the N–1 main switches is greater than 1/(N–1), when the current exceeds the threshold, defining the main switch in an on state among the N–1 main switches as a target main switch, switching the target main switch to a current limiting mode for turning off the target main switch, and controlling the other main switches to maintain in the normal mode; and (e) after the target main switch is switched to the current limiting mode, if the current is lower than the threshold, at a moment when a falling edge of control signals in a reference mode for the N–1 main switches first appears, switching the target main switch to a state in the reference mode corresponding to the moment, wherein the reference mode is a mode where the N–1 main switches do not enter the current limiting mode and continuously operate in the normal mode.

In accordance with another aspect of the present disclosure, a multi-level conversion circuit is provided. The multi-level conversion circuit has the number of levels equal to N which is an integer greater than or equal to 3. The multi-level conversion circuit includes a first input terminal, a second input terminal, a first output terminal, and a second output terminal, an inductor, N−1 lower switches, N−1 upper switches, N−2 flying capacitors, and a controller. The first input terminal and the second input terminal are configured to receive an input voltage, and the first output terminal and the second output terminal are configured to provide an output voltage. The first input terminal is electrically connected to the second output terminal when a potential at the first input terminal is lower than a potential at the second input terminal, and the first input terminal is electrically connected to the first output terminal when the potential at the first input terminal is higher than the potential at the second input terminal. The inductor has a first terminal electrically connected to the second input terminal. The N−1 lower switches are electrically connected in series between a second terminal of the inductor and the second output terminal, and the first lower switch and the N−1$^{th}$ lower switch are electrically coupled to the second terminal of the inductor and the second output terminal respectively. The N−1 upper switches are electrically connected in series between the second terminal of the inductor and the first output terminal, and the first upper switch and the N−1$^{th}$ upper switch are electrically coupled to the second terminal of the inductor and the first output terminal respectively. The k$^{th}$ flying capacitor is connected between a common connection node of the k$^{th}$ lower switch and the k+1$^{th}$ lower switch and a common connection node of the k$^{th}$ upper switch and the k+1$^{th}$ upper switch, and k is a positive integer less than or equal to N−2. When the potential at the first input terminal is lower than the potential at the second input terminal, the controller operates the N−1 lower switches and the N−1 upper switches as N−1 main switches and N−1 synchronous rectification switches respectively. When the potential at the first input terminal is higher than the potential at the second input terminal, the controller operates the N−1 lower switches and the N−1 upper switches as N−1 synchronous rectification switches and N−1 main switches respectively. The controller controls the N−1 main switches to operate in a normal mode, and in the normal mode, control signals of the i$^{th}$ lower switch and the i$^{th}$ upper switch are complementary, and i is a positive integer less than or equal to N−1. The controller detects a current flowing through the inductor and determines whether the current exceeds a threshold. If a duty ratio of the N−1 main switches is greater than 1/(N−1), when the current exceeds the threshold, the controller defines the main switch in an on state among the N−1 main switches as a target main switch, switches the target main switch to a current limiting mode for turning off the target main switch, and controls the other main switches to maintain in the normal mode. After the target main switch is switched to the current limiting mode, if the current is lower than the threshold, at a moment when a falling edge of control signals in a reference mode for the N−1 main switches first appears, the controller switches the target main switch to a state in the reference mode corresponding to the moment. The reference mode is a mode where the N−1 main switches do not enter the current limiting mode and continuously operate in the normal mode.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
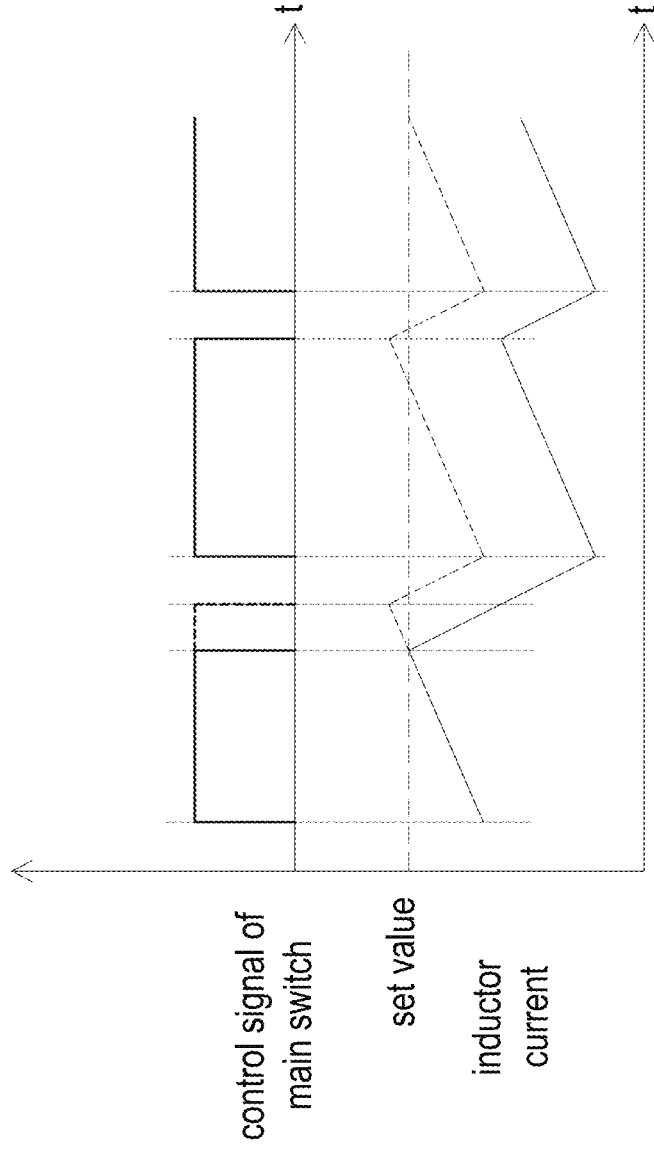
FIG. 1 exemplifies the waveforms of the control signal of the main switch and the inductor current of a conventional two-level conversion circuit.
Figure 2:
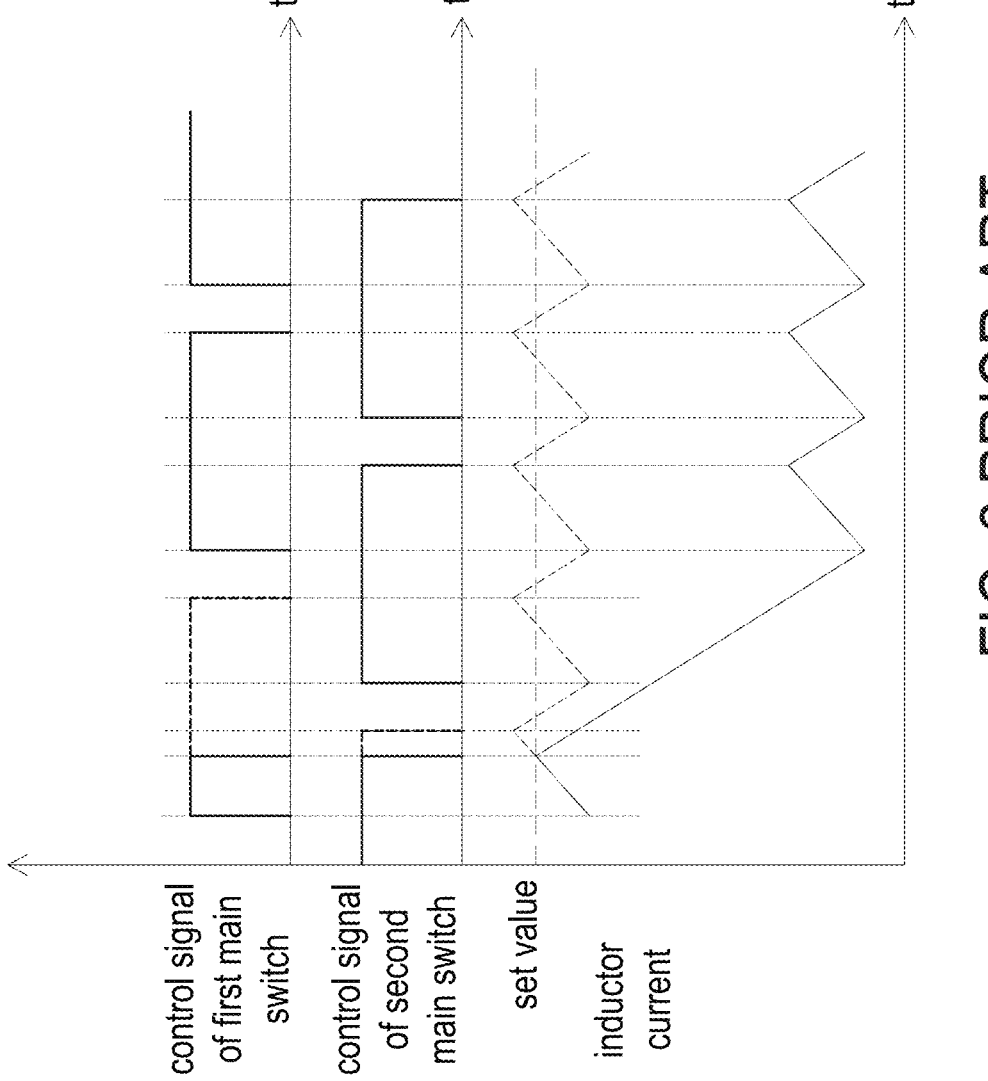
FIG. 2 exemplifies the waveforms of the control signal of the main switch and the inductor current of a conventional flying capacitor three-level conversion circuit.
Figure 3:
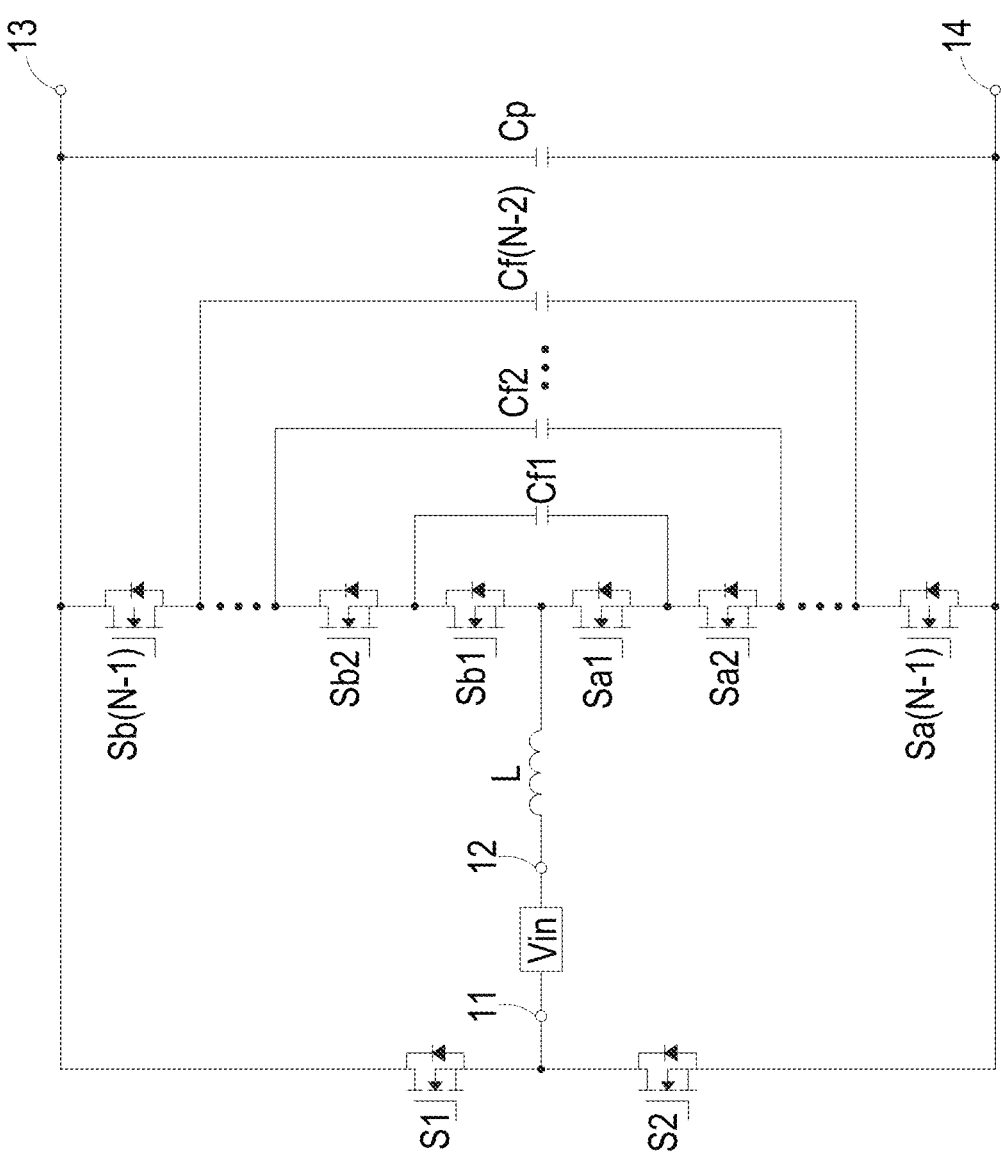
FIG. 3 is a schematic circuit diagram illustrating a multi-level conversion circuit according to an embodiment of the present disclosure.
Figure 3:
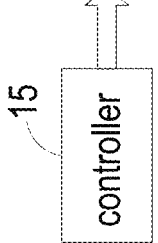

FIG. 3 is a schematic circuit diagram illustrating a multi-level conversion circuit according to an embodiment of the present disclosure. As shown in FIG. 3, the number of levels of a multi-level conversion circuit 1 equals N which is an integer greater than or equal to 3. The multi-level conversion circuit 1 includes a first input terminal 11, a second input terminal 12, a first output terminal 13, a second output terminal 14, an inductor L, N−1 lower switches Sa1, Sa2, . . . , Sa(N−1), N−1 upper switches Sb1, Sb2, . . . , Sb(N−1), N−2 flying capacitors Cf1, Cf2, . . . , Cf(N−2), and a controller 15. The first input terminal 11 and the second input terminal 12 are configured to connect to a power source (DC or AC) for receiving an input voltage Vin. The first output terminal 13 and the second output terminal 14 are configured to provide an output voltage. When a potential at the first input terminal 11 is lower than a potential at the second input terminal 12, the first input terminal 11 is electrically connected to the second output terminal 14. Alternatively, when the potential at the first input terminal 11 is higher than the potential at the second input terminal 12, the first input terminal 11 is electrically connected to the first output terminal 13. A first terminal of the inductor L is electrically connected to the second input terminal 12. All the lower switches Sa1, Sa2, . . . , Sa(N−1) is electrically connected in series between a second terminal of the inductor L and the second output terminal 14, and the first lower switch Sal and the N−1$^{th}$ lower switch Sa(N−1) are electrically coupled to the second terminal of the inductor L and the second output terminal 14 respectively. All the upper switches Sb1, Sb2, . . . , Sb (N−1) are electrically connected in series between the second terminal of the inductor L and the first output terminal 13, and the first upper switch Sb1 and the N−1$^{th}$ upper switch Sb(N−1) are electrically coupled to the second terminal of the inductor L and the first output terminal 13 respectively. Among all the N−2 flying capacitors Cf1, Cf2, . . . , Cf(N−2), the k$^{th}$ flying capacitor Cfk is connected between a common connection node of the kth lower switch Sak and the k+1$^{th}$ lower switch Sa(k+1) and a common connection node of the k$^{th}$ upper switch Sbk and the k+1$^{th}$ upper switch Sb(k+1), and k is a positive integer less than or equal to N−2 (i.e., k=1, 2, . . . , (N−2)). The controller 15 is configured to control operation of all the switches in the multi-level conversion circuit 1.

The input voltage Vin received by the first input terminal 11 and the second input terminal 12 may be a DC voltage or an AC voltage. When the input voltage Vin is a DC voltage and the potential at the first input terminal 11 is always lower than the potential at the second input terminal 12, the first input terminal 11 is connected to the second output terminal 14. When the input voltage Vin is a DC voltage and the potential at the first input terminal 11 is always higher than the potential at the second input terminal 12, the first input terminal 11 is connected to the first output terminal 13. When the input voltage Vin is an AC voltage and the input voltage Vin is in the positive half cycle, the potential at the first input terminal 11 is lower than the potential at the second input terminal 12, and the first input terminal 11 is connected to the second output terminal 14. When the input voltage Vin is an AC voltage and the input voltage Vin is in the negative half cycle, the potential at the first input terminal 11 is higher than the potential at the second input terminal 12, and the first input terminal 11 is connected to the first output terminal 13.

In addition, in an embodiment, for controlling the first input terminal 11 to connect to the first output terminal 13 or the second output terminal 14, the multi-level conversion circuit 1 further includes a first input switch SI and a second input switch S2. In specific, the first input switch S1 is electrically coupled between the first input terminal 11 and the first output terminal 13, and the second input switch S2 is electrically coupled between the first input terminal 11 and the second output terminal 14. When the potential at the first input terminal 11 is lower than the potential at the second input terminal 12, the controller 15 turns off the first input switch S1 and turns on the second input switch S2 so that the first input terminal 11 is connected to the second output terminal 14. When the potential at the first input terminal 11 is higher than the potential at the second input terminal 12, the controller 15 turns on the first input switch SI and turns off the second input switch S2 so that the first input terminal 11 is connected to the first output terminal 13.

In an embodiment, the multi-level conversion circuit 1 further includes an output capacitor Cp electrically connected between the first output terminal 13 and the second output terminal 14.

Three cycle-by-cycle protection methods of the multi-level conversion circuit 1, which are the first, second and third cycle-by-cycle protection methods respectively, are exemplified as follows according to FIG. 4, FIG. 5 and FIG. 6.

Figure 4:
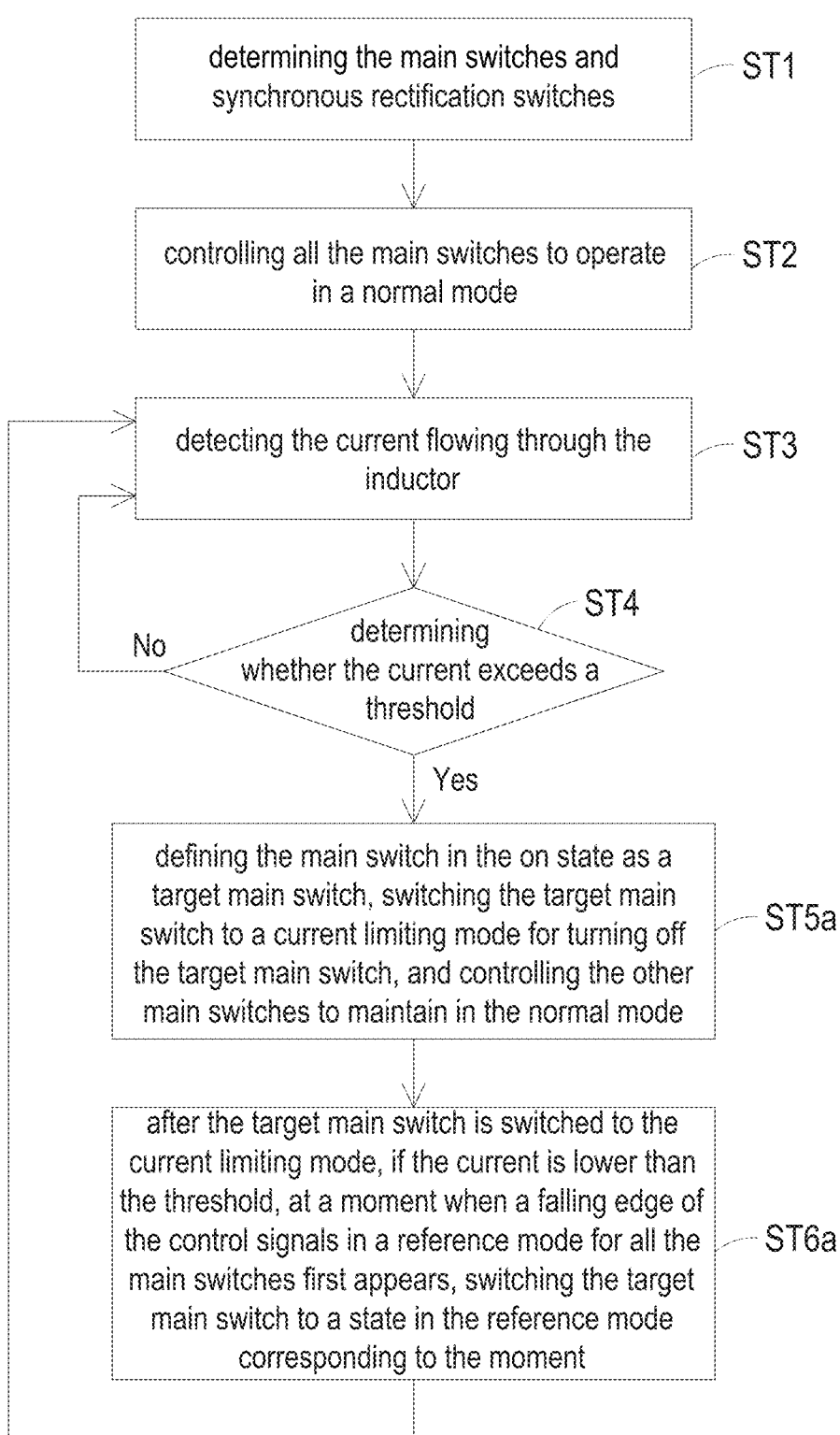
FIG. 4 is a schematic flow chart illustrating a first cycle-by-cycle protection method for the multi-level conversion circuit according to an embodiment of the present disclosure.

FIG. 4 is a schematic flow chart illustrating the first cycle-by-cycle protection method for the multi-level conversion circuit according to an embodiment of the present disclosure. The first cycle-by-cycle protection method includes the following steps.

Firstly, in step ST1, the main switches and synchronous rectification switches are determined. Specifically, when the potential at the first input terminal 11 is lower than the potential at the second input terminal 12, all the N−1 lower switches Sa1-Sa(N−1) are operated as the main switches, and all the N−1 upper switches Sb1-Sb(N−1) are operated as the synchronous rectification switches. When the potential at the first input terminal 11 is higher than the potential at the second input terminal 12, all the N−1 lower switches Sa1-Sa(N−1) are operated as the synchronous rectification switches, and all the N−1 upper switches Sb1-Sb(N−1) are operated as the main switches. The control signals of the main switch and the synchronous rectification switch corresponding to each other are complementary.

Afterwards, in step ST2, all the N−1 main switches are controlled to operate in a normal mode. In the normal mode, the control signals of the i$^{th}$ main switch and the i$^{th}$ synchronous rectification switch are complementary, and i is a positive integer less than or equal to N−1. It is noted that the cycle-by-cycle protection methods of the present disclosure focus on the situation that the duty ratio of main switches is greater than 1/(N−1). When the duty ratio of main switches is less than or equal to 1/(N−1), the rise and fall of the current iL flowing through the inductor L is only affected by one main switch at any moment. Under this circumstance, the conventional approach of cycle-by-cycle current limiting may be adopted, and thus this situation would be not discussed in the cycle-by-cycle protection method of the present disclosure.

Then, in step ST3, the current iL flowing through the inductor L is detected.

Afterwards, in step ST4, whether the current iL exceeds a threshold iTH is determined. The threshold iTH may be set according actual requirements.

In the case that the duty ratio of main switches is greater than 1/(N−1), if the determination result of step ST4 is true (i.e., the current iL exceeds the threshold iTH), the step ST5a is performed. In step ST5a, the main switch in the on state is defined as a target main switch, the target main switch is switched to a current limiting mode for turning off the target main switch, and the other main switches are controlled to maintain in the normal mode. Thereby, the main switch in the on state is turned off immediately when the current iL exceeds the threshold iTH so that the current iL is reduced and the current limiting protection is realized.

As shown in step ST6a, after the target main switch is switched to the current limiting mode, if the current iL is lower than the threshold iTH, at a moment when a falling edge of the control signals in a reference mode for all the N−1 main switches first appears, the target main switch is switched to a state in the reference mode corresponding to the moment. The reference mode is a mode where all the N−1 main switches do not enter the current limiting mode and continuously operate in the normal mode. It is noted that the reference mode is an assumed mode rather than an actual operating mode and is used for determining the timing of controlling the target main switch to exit the current limiting mode.

In an embodiment, when the determination result of step ST4 is false or after the step ST6a is performed, the step ST3 may be performed again to continuously monitor whether the current iL exceeds the threshold iTH.

Figure 5:
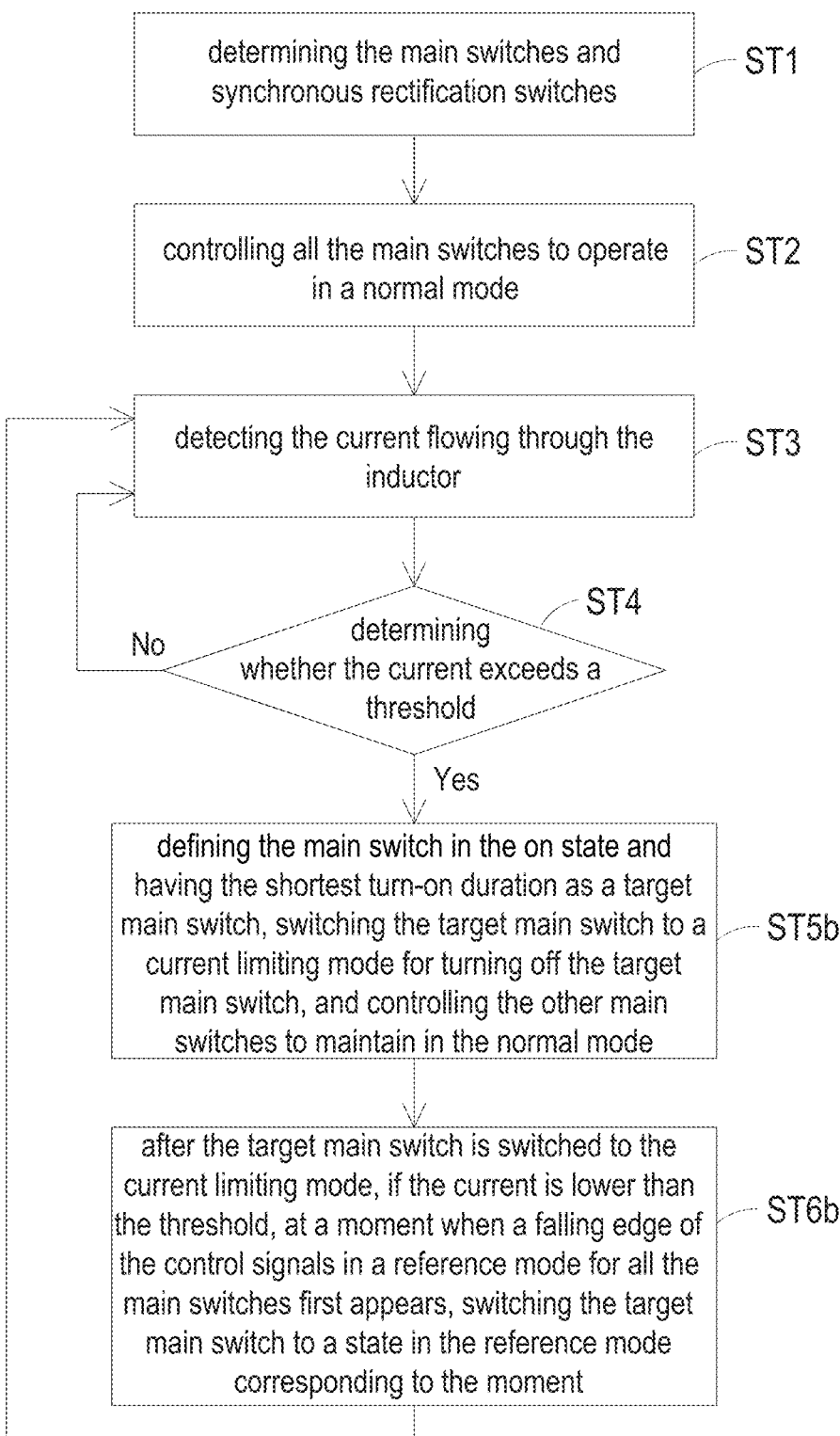
FIG. 5 is a schematic flow chart illustrating a second cycle-by-cycle protection method for the multi-level conversion circuit according to an embodiment of the present disclosure.

FIG. 5 is a schematic flow chart illustrating the second cycle-by-cycle protection method for the multi-level conversion circuit according to an embodiment of the present disclosure. The same steps of the first and second cycle-by-cycle protection methods are designated by the same numeral references, and thus the detailed descriptions thereof are omitted herein. While in the second cycle-by-cycle protection method, the steps ST5a and ST6a of the first cycle-by-cycle protection method are replaced by the steps ST5b and ST6b.

In the second cycle-by-cycle protection method, as shown in FIG. 5, if the determination result of step ST4 is true (i.e., the current iL exceeds the threshold iTH), the step ST5b is performed. In step ST5b, the main switch in the on state and having the shortest turn-on duration among all the N−1 main switches is defined as the target main switch, the target main switch is switched to the current limiting mode for turning off the target main switch, and the other main switches are controlled to maintain in the normal mode. Thereby, the main switch in the on state and having the shortest turn-on duration is turned off immediately when the current iL exceeds the threshold iTH so that the current iL is reduced and the current limiting protection is realized. In an embodiment, when the current iL exceeds the threshold iTH, the turn-on duration of the target main switch is shorter than Ts/(N−1), and Ts is the switching circle of the main switches.

As shown in step ST6b, after the target main switch is switched to the current limiting mode, if the current iL is lower than the threshold iTH, at a moment when a falling edge of the control signals in a reference mode for all the N−1 main switches first appears, the target main switch is switched to a state in the reference mode corresponding to the moment. In an embodiment, when the determination result of step ST4 is false or after the step ST6b is performed, the step ST3 may be performed again to continuously monitor whether the current iL exceeds the threshold iTH.

Figure 6:
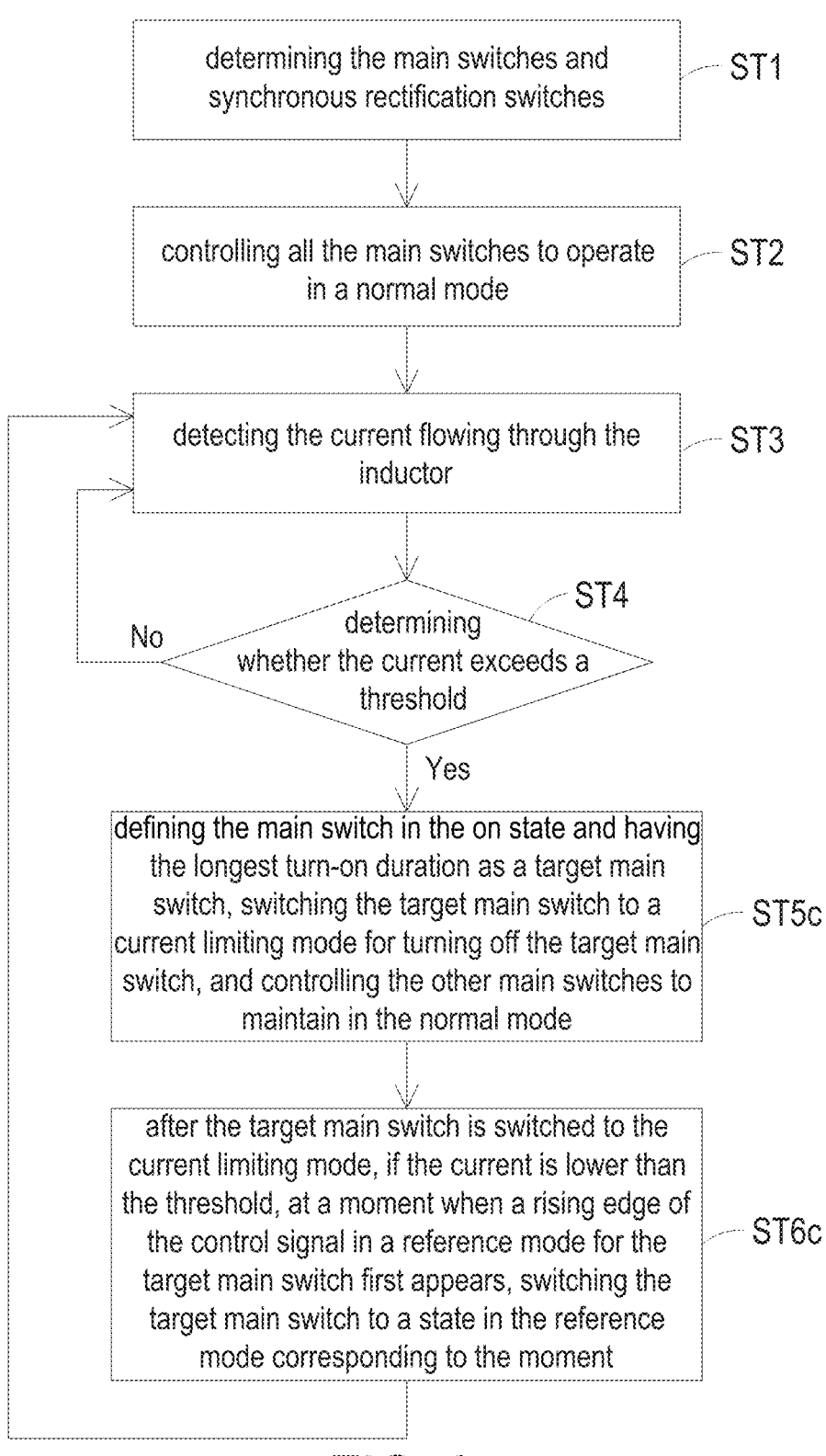
FIG. 6 is a schematic flow chart illustrating a third cycle-by-cycle protection method for the multi-level conversion circuit according to an embodiment of the present disclosure.

FIG. 6 is a schematic flow chart illustrating the third cycle-by-cycle protection method for the multi-level conversion circuit according to an embodiment of the present disclosure. The same steps of the first and third cycle-by-cycle protection method are designated by the same numeral references, and thus the detailed descriptions thereof are omitted herein. While in the third cycle-by-cycle protection method, the steps ST5a and ST6a of the first cycle-by-cycle protection method are replaced by the steps ST5c and ST6c.

In the third cycle-by-cycle protection method, as shown in FIG. 6, if the determination result of step ST4 is true (i.e., the current iL exceeds the threshold iTH), the step ST5c is performed. In step ST5c, the main switch in the on state and having the longest turn-on duration among all the N−1 main switches is defined as the target main switch, the target main switch is switched to the current limiting mode for turning off the target main switch, and the other main switches are controlled to maintain in the normal mode. Thereby, the main switch in the on state and having the longest turn-on duration is turned off immediately when the current iL exceeds the threshold iTH so that the current iL is reduced and the current limiting protection is realized. In an embodiment, when the current iL exceeds the threshold iTH, the turn-on duration of the target main switch is longer than Ts*(N−2)/(N−1), and Ts is the switching circle of the main switches.

As shown in step ST6c, after the target main switch is switched to the current limiting mode, if the current iL is lower than the threshold iTH, at a moment when a rising edge of the control signal in a reference mode for the target main switch first appears, the target main switch is switched to a state in the reference mode corresponding to the moment. In an embodiment, when the determination result of step ST4 is false or after the step ST6c is performed, the step ST3 may be performed again to continuously monitor whether the current iL exceeds the threshold iTH.

According to the above descriptions, after the current limiting protection is triggered, as a period of time passes and the current iL is lower than the threshold iTH, the target main switch is switched to the corresponding state of the reference mode at a specific moment rather than the end of the current switching cycle. Thereby, the inductor current (i.e., the current iL) is maintained to not exceed the threshold, and meanwhile the large fluctuation in the inductor current is avoided.

In addition, it is noted that the above-mentioned cycle-by-cycle protection methods determine the timing of switching the target main switch mainly based on the control signals of the main switches in the reference mode. Since the control signals of the main switches and the synchronous rectification switches are complementary, the timing of switching the target main switch can also be determined based on the control signals of the synchronous rectification switches in the reference mode for the same principle, and the detailed descriptions thereof are omitted herein.

To easily understand the practical implementation of the cycle-by-cycle protection methods, the waveforms of the main switches and inductor current of the multi-level conversion circuit 1 adopting the first, second and third cycle-by-cycle protection methods are exemplified as follows, but the practical implementation of the present disclosure is not limited thereto. Further, in the waveforms corresponding to the following descriptions, G1, G2, and G3 represent the control signals of the main switches Sm1, Sm2 and Sm3 respectively (corresponding to the lower switches Sa1, Sa2 and Sa3 respectively or the upper switches Sb1, Sb2 and Sb3 respectively according to the actual situation). The dashed lines represent the waveforms under the reference mode, the solid lines represent the waveforms while applying the cycle-by-cycle protection method, and the shadow area highlights the actual turn-on duration of the main switches around the timing of triggering the current limiting protection.

In a first implementation, the number of levels of the multi-level conversion circuit 1 equals three (i.e., N=3), the multi-level conversion circuit is a three-level conversion circuit, and the duty ratio of the main switches is greater than 0.5.

Figure 7A:
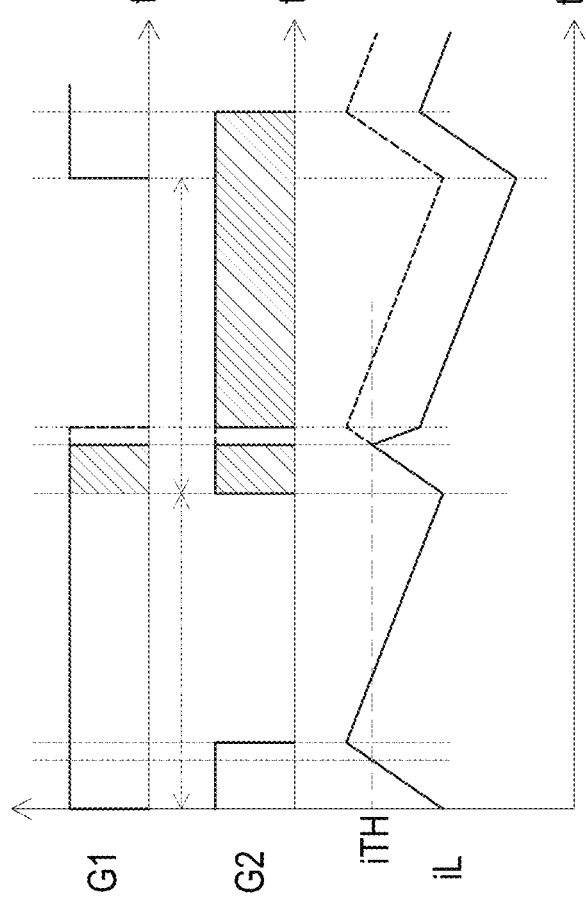
FIGS. 7A and 7B exemplify the waveforms of main switches and an inductor current of the three-level conversion circuit performing the first cycle-by-cycle protection method.
Figure 7B:
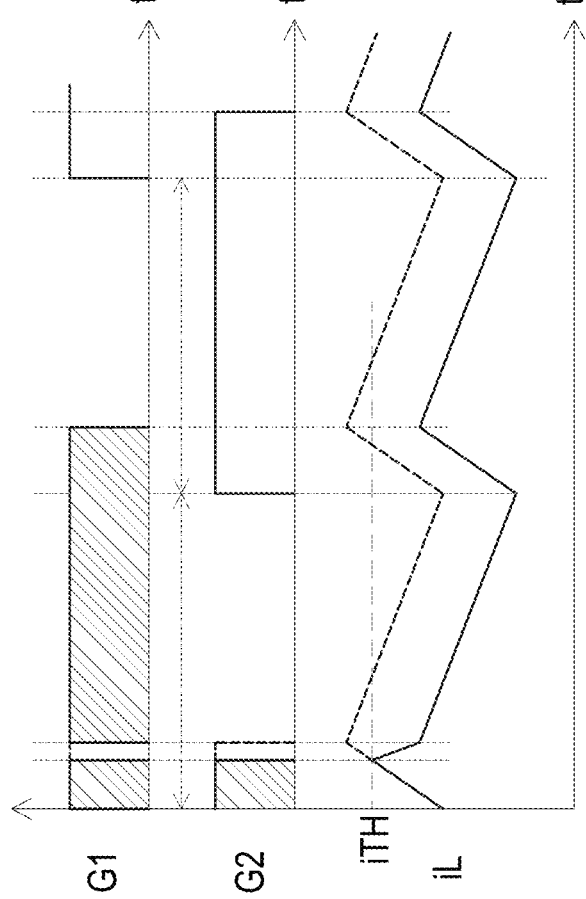

FIGS. 7A and 7B exemplify the waveforms of the main switches and the inductor current of the three-level conversion circuit performing the first cycle-by-cycle protection method. In order to make the figures concise and clear, FIGS. 7A and 7B show the waveforms with the current limiting protection of the cycle-by-cycle protection method being triggered at different timings (or in different switching cycles). However, in fact, the three-level conversion circuit may perform the cycle-by-cycle protection method continuously rather than in a single switching cycle, which is also adapted to the succeeding waveforms.

In FIG. 7A, when the current iL exceeds the threshold iTH, the main switches Sm1 and Sm2 in the on state are switched to the current limiting mode so as to turn off the main switches Sm1 and Sm2 and reduce the current iL. After the current iL is lower than the threshold iTH, the main switches Sm1 and Sm2 are switched to the corresponding state of the reference mode at the moment that the control signals G1 and G2 of all the main switches Sm1 and Sm2 firstly appear the falling edge in the reference mode (i.e., at the falling edge of the control signal G1 of the main switch Sm1 in the reference mode). At this moment, the main switch Sm1 is maintained in the off state, and the main switch Sm2 is turned on.

In FIG. 7B, when the current iL exceeds the threshold iTH, the main switches Sm1 and Sm2 in the on state are switched to the current limiting mode so as to turn off the main switches Sm1 and Sm2 and reduce the current iL. After the current iL is lower than the threshold iTH, the main switches Sm1 and Sm2 are switched to the corresponding state of the reference mode at the moment that the control signals G1 and G2 of all the main switches Sm1 and Sm2 firstly appear the falling edge in the reference mode (i.e., at the falling edge of the control signal G2 of the main switch Sm2 in the reference mode). At this moment, the main switch Sm1 is turned on, and the main switch Sm2 is maintained in the off state.

Figure 8A:
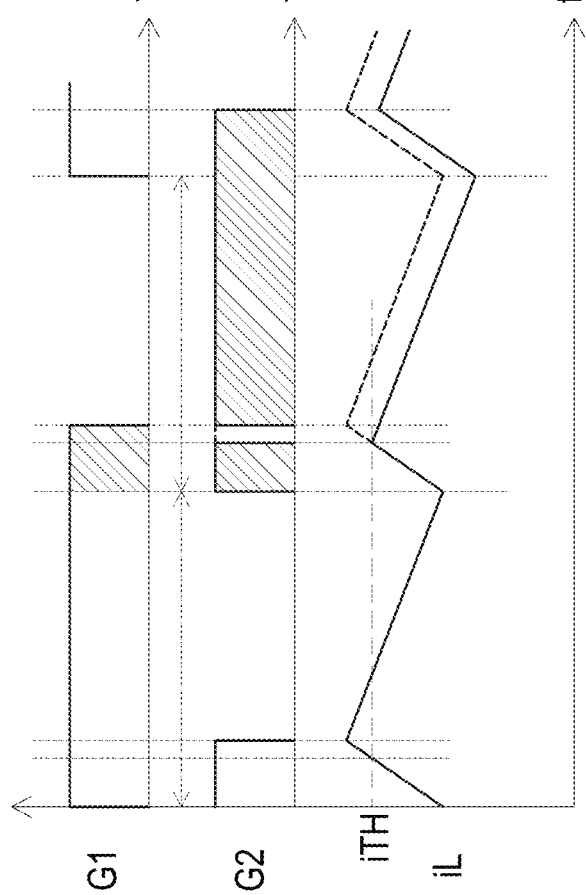
FIGS. 8A and 8B exemplify the waveforms of main switches and an inductor current of the three-level conversion circuit performing the second cycle-by-cycle protection method.
Figure 8B:
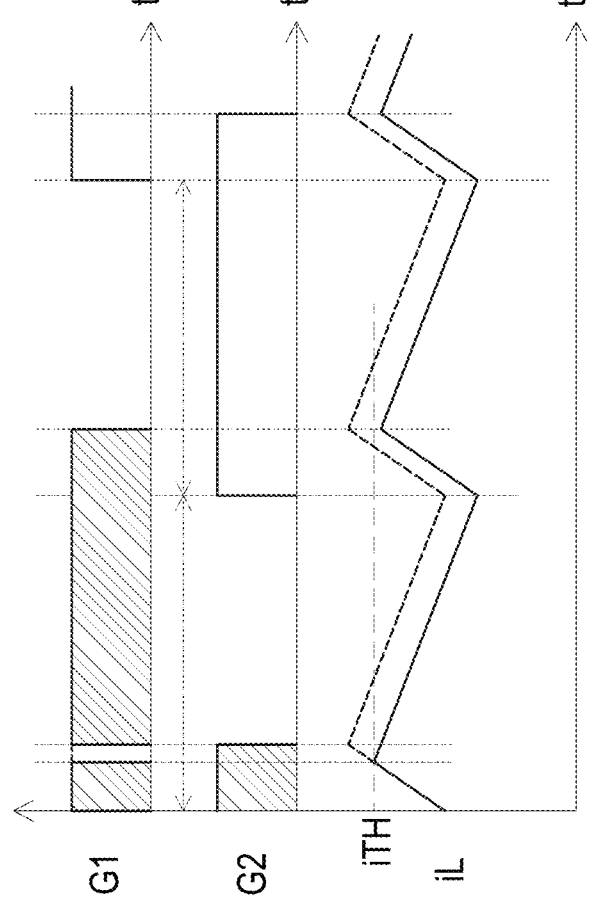

FIGS. 8A and 8B exemplify the waveforms of the main switches and the inductor current of the three-level conversion circuit performing the second cycle-by-cycle protection method.

In FIG. 8A, when the current iL exceeds the threshold iTH, the main switch Sm2 in the on state and having the shortest turn-on duration is switched to the current limiting mode so as to turn off the main switch Sm2 and reduce the current iL. After the current iL is lower than the threshold iTH, the main switch Sm2 is switched to the corresponding state of the reference mode at the moment that the control signals G1 and G2 of all the main switches Sm1 and Sm2 firstly appear the falling edge in the reference mode (i.e., at the falling edge of the control signal G1 of the main switch Sm1 in the reference mode). At this moment, the main switch Sm2 is turned on.

In FIG. 8B, when the current iL exceeds the threshold iTH, the main switch Sm1 in the on state and having the shortest turn-on duration is switched to the current limiting mode so as to turn off the main switch Sm1 and reduce the current iL. After the current iL is lower than the threshold iTH, the main switch Sm1 is switched to the corresponding state of the reference mode at the moment that the control signals G1 and G2 of all the main switches Sm1 and Sm2 firstly appear the falling edge in the reference mode (i.e., at the falling edge of the control signal G2 of the main switch Sm2 in the reference mode). At this moment, the main switch Sm1 is turned on.

Figure 9A:
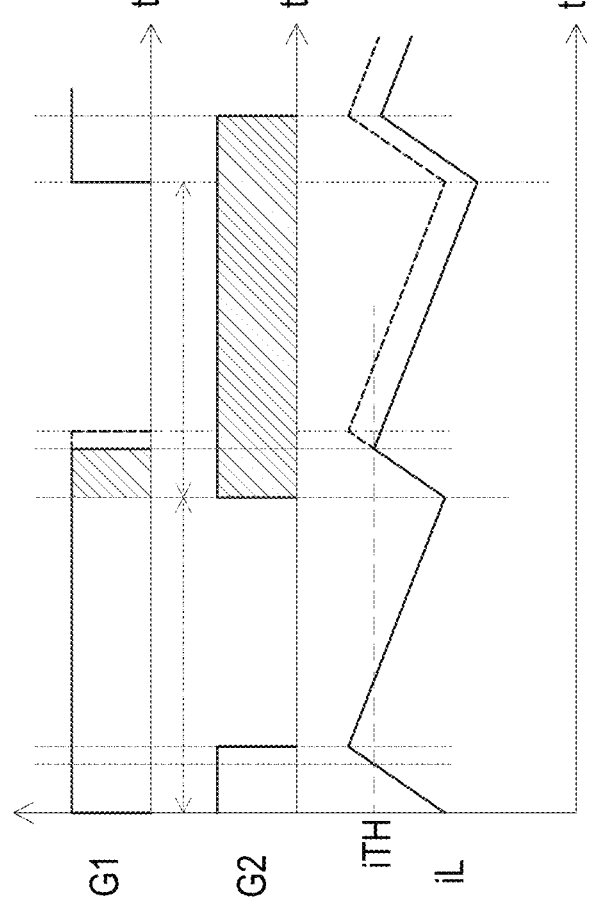
FIGS. 9A and 9B exemplify the waveforms of main switches and an inductor current of the three-level conversion circuit performing the third cycle-by-cycle protection method.
Figure 9B:
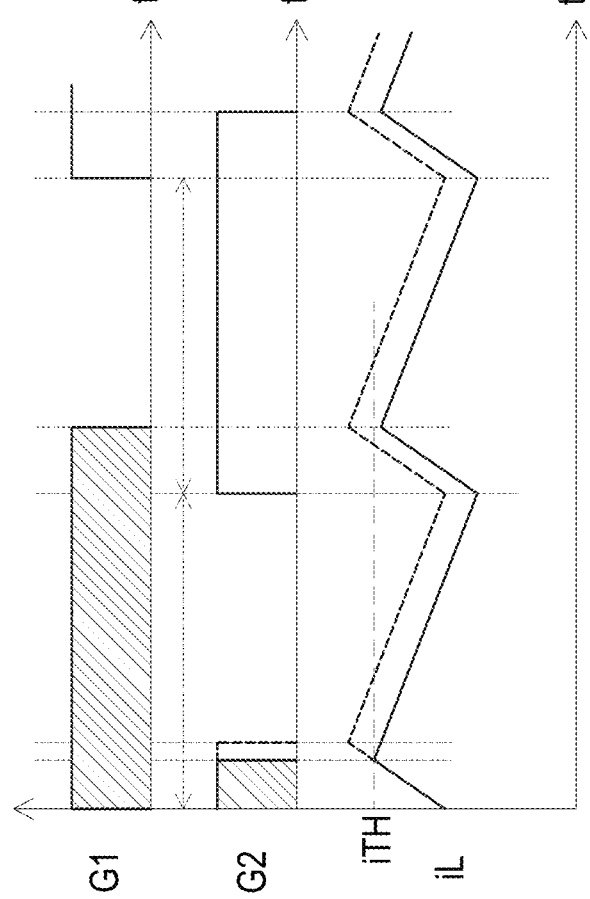

FIGS. 9A and 9B exemplify the waveforms of the main switches and the inductor current of the three-level conversion circuit performing the third cycle-by-cycle protection method.

In FIG. 9A, when the current iL exceeds the threshold iTH, the main switch Sm1 in the on state and having the longest turn-on duration is switched to the current limiting mode so as to turn off the main switch Sm1 and reduce the current iL. After the current iL is lower than the threshold iTH, the main switch Sm1 is switched to the corresponding state of the reference mode at the moment that the control signal G1 of the main switch Sm1 firstly appears the rising edge in the reference mode. At this moment, the main switch Sm1 is turned on.

In FIG. 9B, when the current iL exceeds the threshold iTH, the main switch Sm2 in the on state and having the longest turn-on duration is switched to the current limiting mode so as to turn off the main switch Sm2 and reduce the current iL. After the current iL is lower than the threshold iTH, the main switch Sm2 is switched to the corresponding state of the reference mode at the moment that the control signal G2 of the main switch Sm2 firstly appears the rising edge in the reference mode. At this moment, the main switch Sm2 is turned on.

In a second implementation, the number of levels of the multi-level conversion circuit 1 equals four (i.e., N=4), the multi-level conversion circuit is a four-level conversion circuit, and the duty ratio of the main switches is greater than ⅓.

Figure 10A:
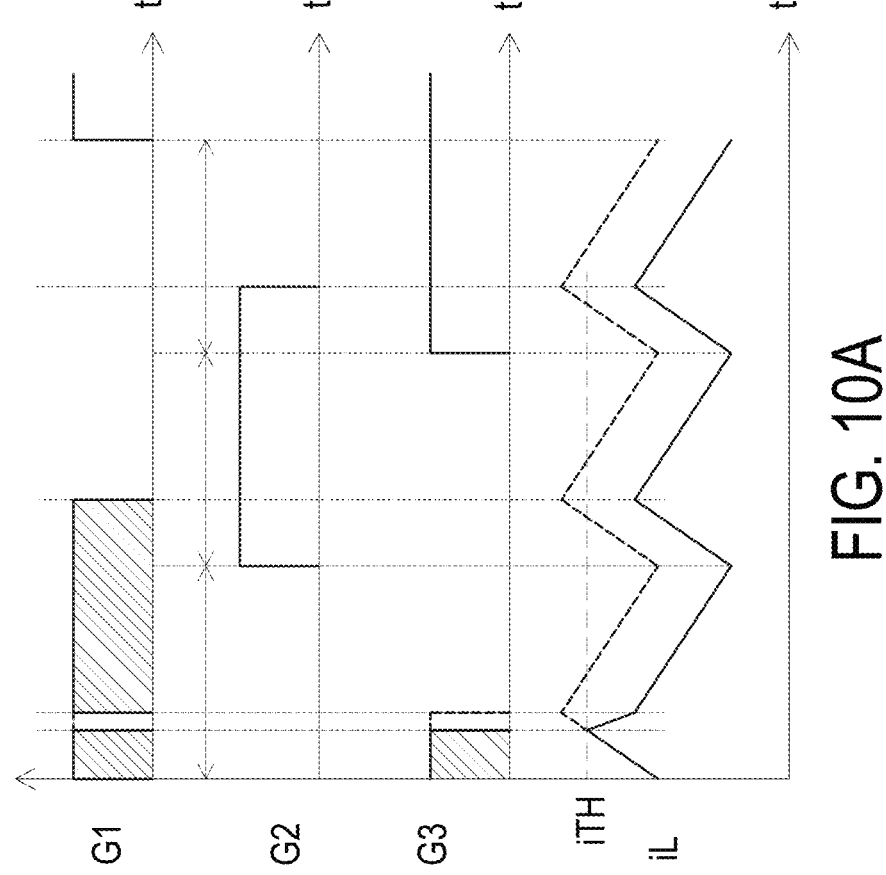
FIGS. 10A, 10B and 10C exemplify the waveforms of main switches and an inductor current of the four-level conversion circuit performing the first cycle-by-cycle protection method, and a duty ratio of the main switches is greater than 1/3 and less than 2/3.
Figure 10B:
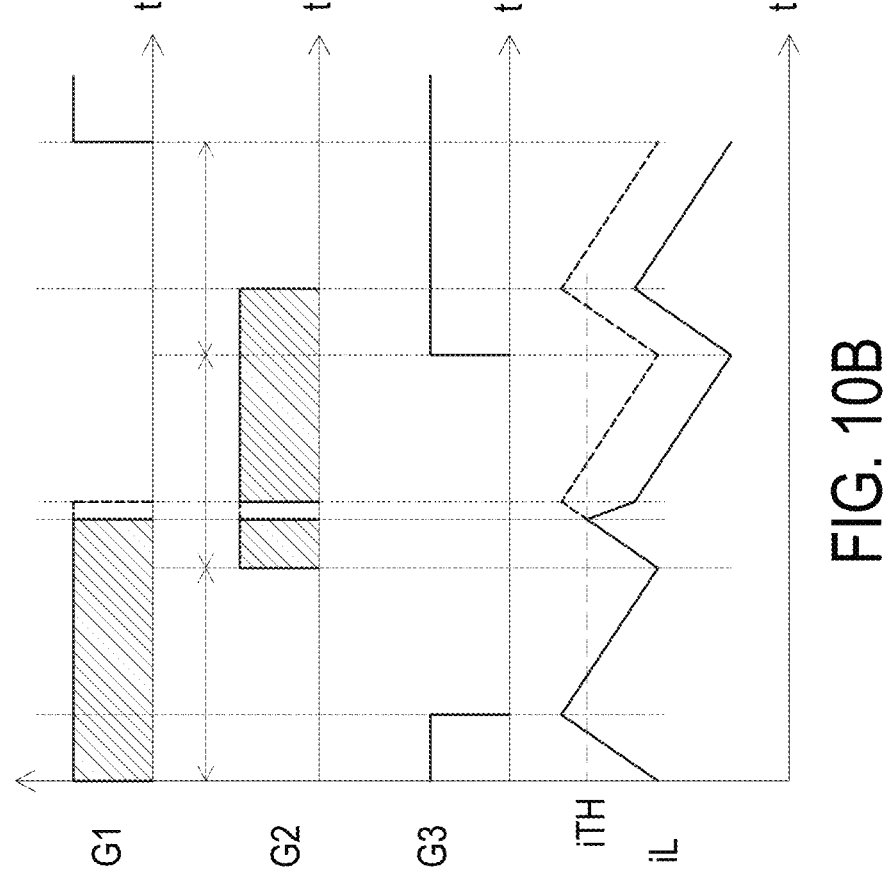
Figure 10C:
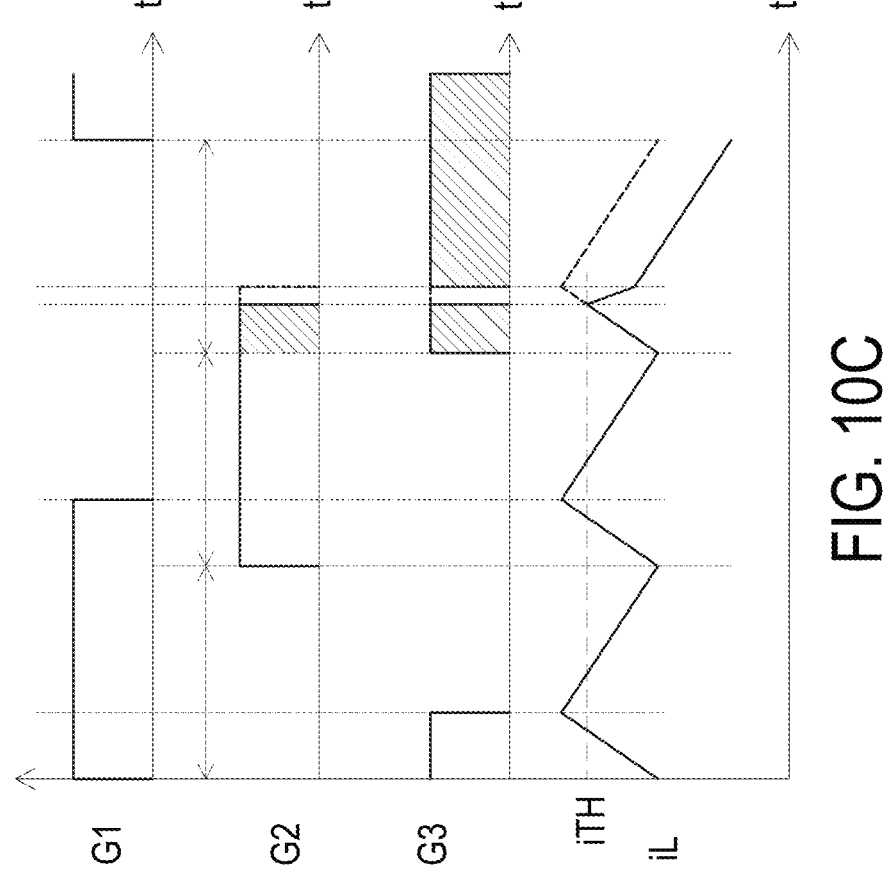

FIGS. 10A, 10B and 10C exemplify the waveforms of the main switches and the inductor current of the four-level conversion circuit performing the first cycle-by-cycle protection method, and the duty ratio of the main switches is greater than ⅓ and less than ⅔.

In FIG. 10A, when the current iL exceeds the threshold iTH, the main switches Sm1 and Sm3 in the on state are switched to the current limiting mode so as to turn off the main switches Sm1 and Sm3 and reduce the current iL. After the current iL is lower than the threshold iTH, the main switches Sm1 and Sm3 are switched to the corresponding state of the reference mode at the moment that the control signals G1, G2 and G3 of all the main switches Sm1, Sm2 and Sm3 firstly appear the falling edge in the reference mode (i.e., at the falling edge of the control signal G3 of the main switch Sm3 in the reference mode). At this moment, the main switch Sm1 is turned on, and the main switch Sm3 is maintained in the off state.

In FIG. 10B, when the current iL exceeds the threshold iTH, the main switches Sm1 and Sm2 in the on state are switched to the current limiting mode so as to turn off the main switches Sm1 and Sm2 and reduce the current iL. After the current iL is lower than the threshold iTH, the main switches Sm1 and Sm2 are switched to the corresponding state of the reference mode at the moment that the control signals G1, G2 and G3 of all the main switches Sm1, Sm2 and Sm3 firstly appear the falling edge in the reference mode (i.e., at the falling edge of the control signal G1 of the main switch Sm1 in the reference mode). At this moment, the main switch Sm1 is maintained in the off state, and the main switch Sm2 is turned on.

In FIG. 10C, when the current iL exceeds the threshold iTH, the main switches Sm2 and Sm3 in the on state are switched to the current limiting mode so as to turn off the main switches Sm2 and Sm3 and reduce the current iL. After the current iL is lower than the threshold iTH, the main switches Sm2 and Sm3 are switched to the corresponding state of the reference mode at the moment that the control signals G1, G2 and G3 of all the main switches Sm1, Sm2 and Sm3 firstly appear the falling edge in the reference mode (i.e., at the falling edge of the control signal G2 of the main switch Sm2 in the reference mode). At this moment, the main switch Sm2 is maintained in the off state, and the main switch Sm3 is turned on.

Figure 11A:
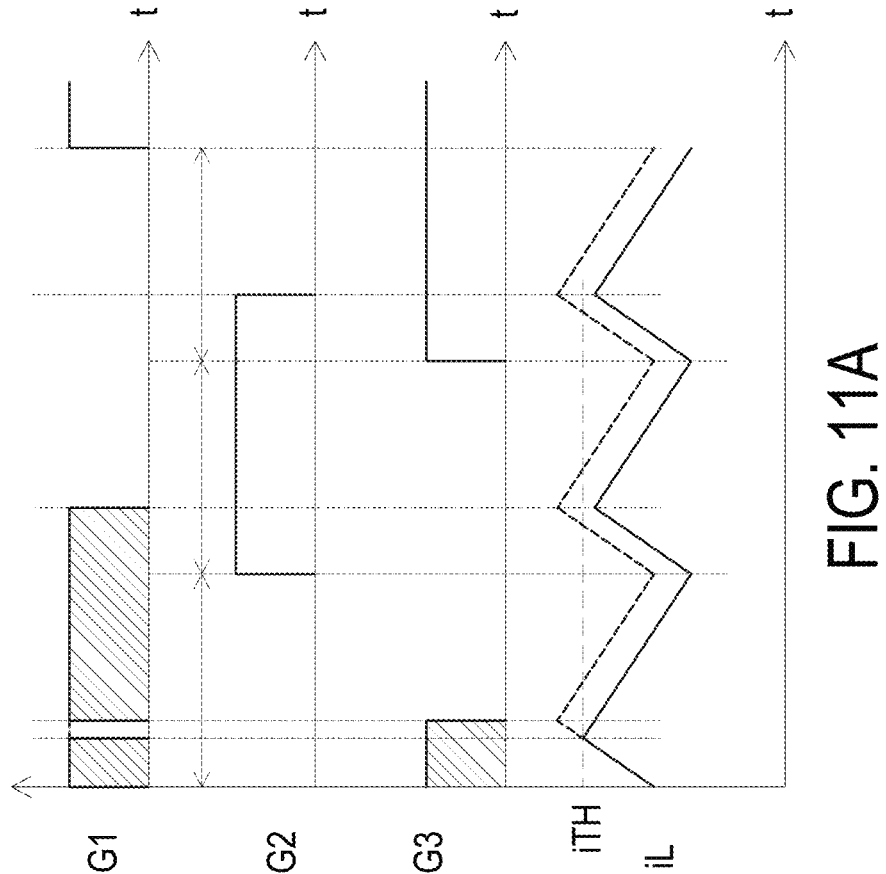
FIGS. 11A, 11B and 11C exemplify the waveforms of main switches and an inductor current of the four-level conversion circuit performing the second cycle-by-cycle protection method, and a duty ratio of the main switches is greater than 1/3 and less than 2/3.
Figure 11B:
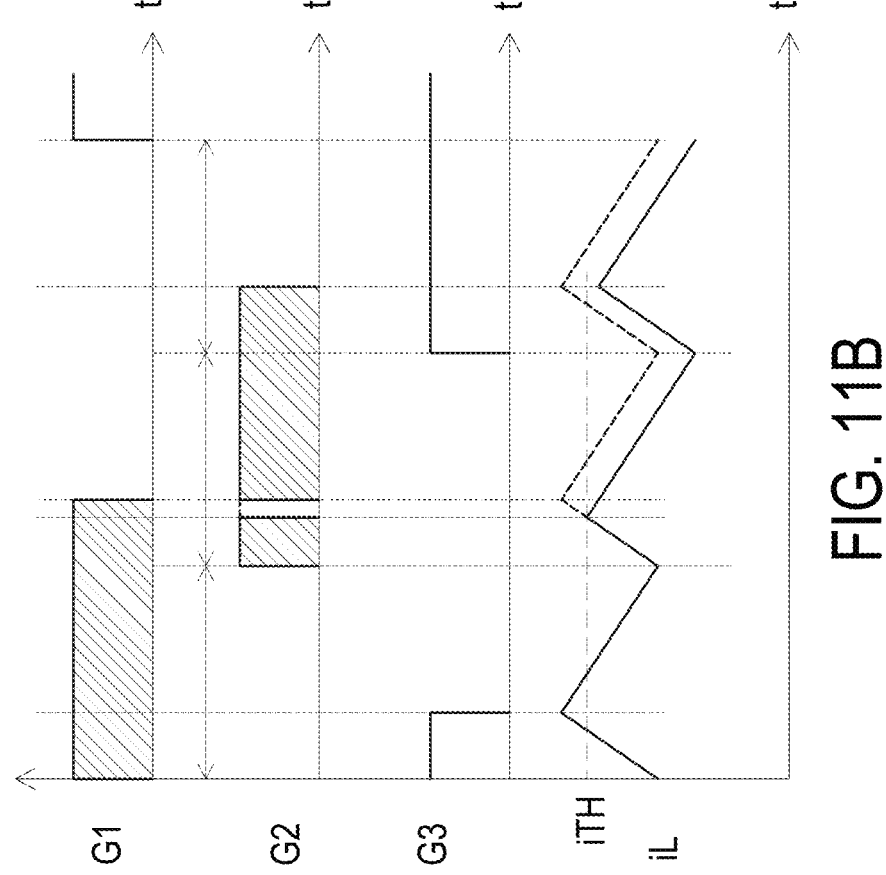
Figure 11C:
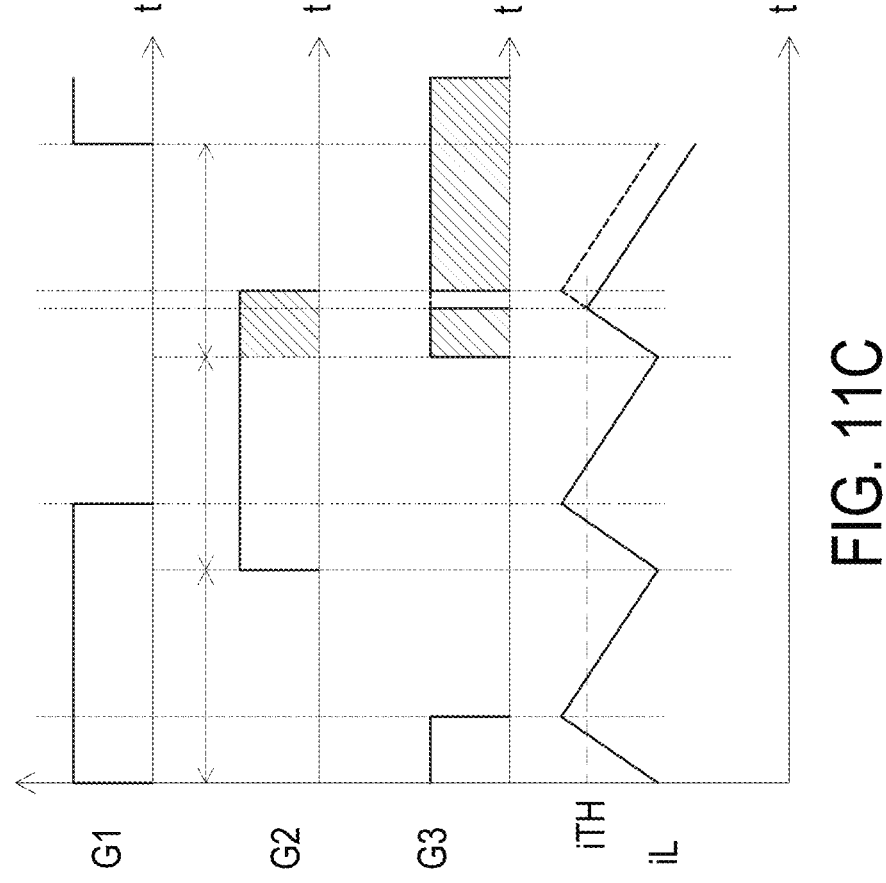

FIGS. 11A, 11B and 11C exemplify the waveforms of the main switches and the inductor current of the four-level conversion circuit performing the second cycle-by-cycle protection method, and the duty ratio of the main switches is greater than ⅓ and less than ⅔.

In FIG. 11A, when the current iL exceeds the threshold iTH, the main switch Sm1 in the on state and having the shortest turn-on duration is switched to the current limiting mode so as to turn off the main switch Sm1 and reduce the current iL. After the current iL is lower than the threshold iTH, the main switch Sm1 is switched to the corresponding state of the reference mode at the moment that the control signals G1, G2 and G3 of all the main switches Sm1, Sm2 and Sm3 firstly appear the falling edge in the reference mode (i.e., at the falling edge of the control signal G3 of the main switch Sm3 in the reference mode). At this moment, the main switch Sm1 is turned on.

In FIG. 11B, when the current iL exceeds the threshold iTH, the main switch Sm2 in the on state and having the shortest turn-on duration is switched to the current limiting mode so as to turn off the main switch Sm2 and reduce the current iL. After the current iL is lower than the threshold iTH, the main switch Sm2 is switched to the corresponding state of the reference mode at the moment that the control signals G1, G2 and G3 of all the main switches Sm1, Sm2 and Sm3 firstly appear the falling edge in the reference mode (i.e., at the falling edge of the control signal G1 of the main switch Sm1 in the reference mode). At this moment, the main switch Sm2 is turned on.

In FIG. 11C, when the current iL exceeds the threshold iTH, the main switch Sm3 in the on state and having the shortest turn-on duration is switched to the current limiting mode so as to turn off the main switch Sm3 and reduce the current iL. After the current iL is lower than the threshold iTH, the main switch Sm3 is switched to the corresponding state of the reference mode at the moment that the control signals G1, G2 and G3 of all the main switches Sm1, Sm2 and Sm3 firstly appear the falling edge in the reference mode (i.e., at the falling edge of the control signal G2 of the main switch Sm2 in the reference mode). At this moment, the main switch Sm3 is turned on.

Figure 12A:
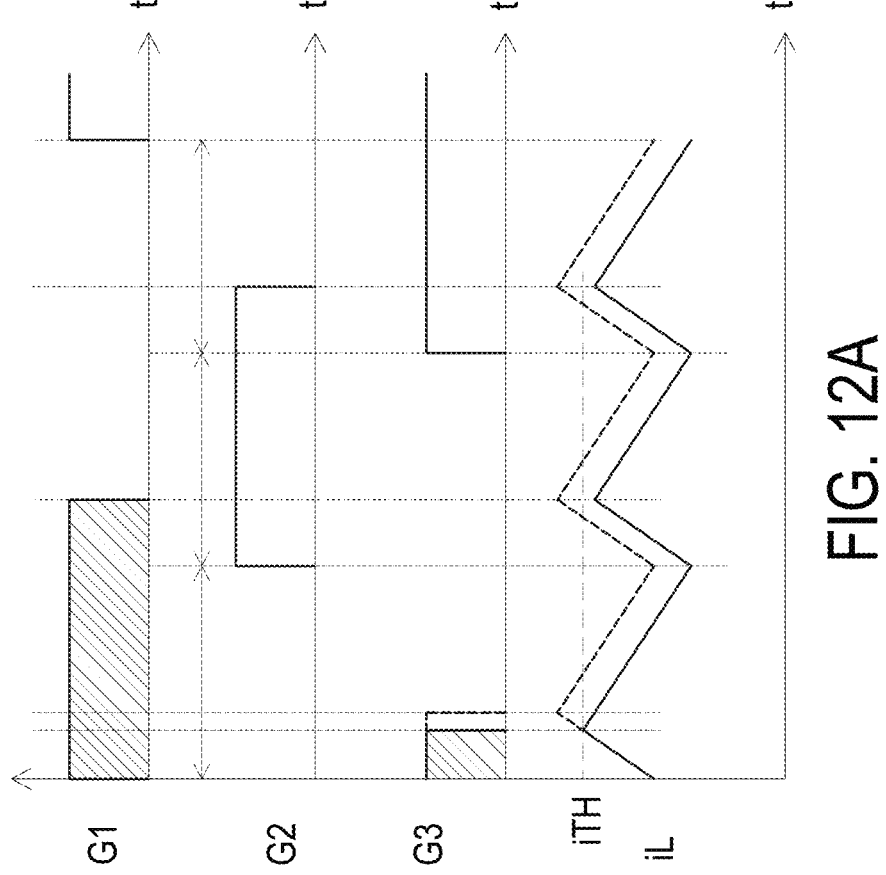
FIGS. 12A, 12B and 12C exemplify the waveforms of main switches and an inductor current of the four-level conversion circuit performing the third cycle-by-cycle protection method, and a duty ratio of the main switches is greater than 1/3 and less than 2/3.
Figure 12B:
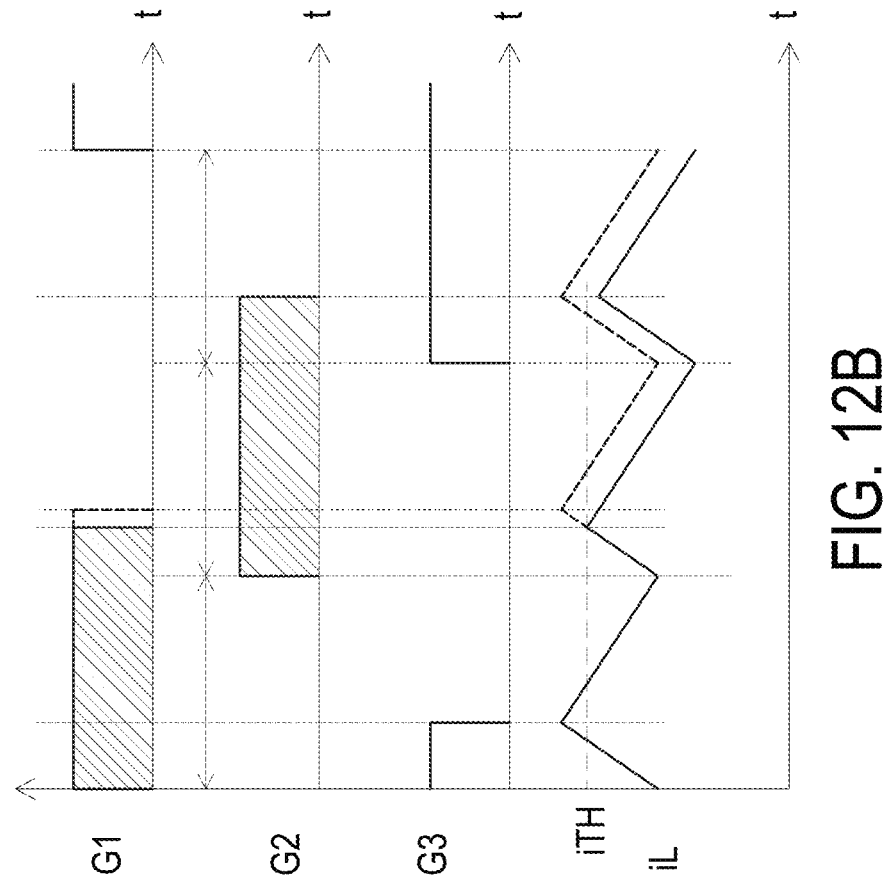
Figure 12C:
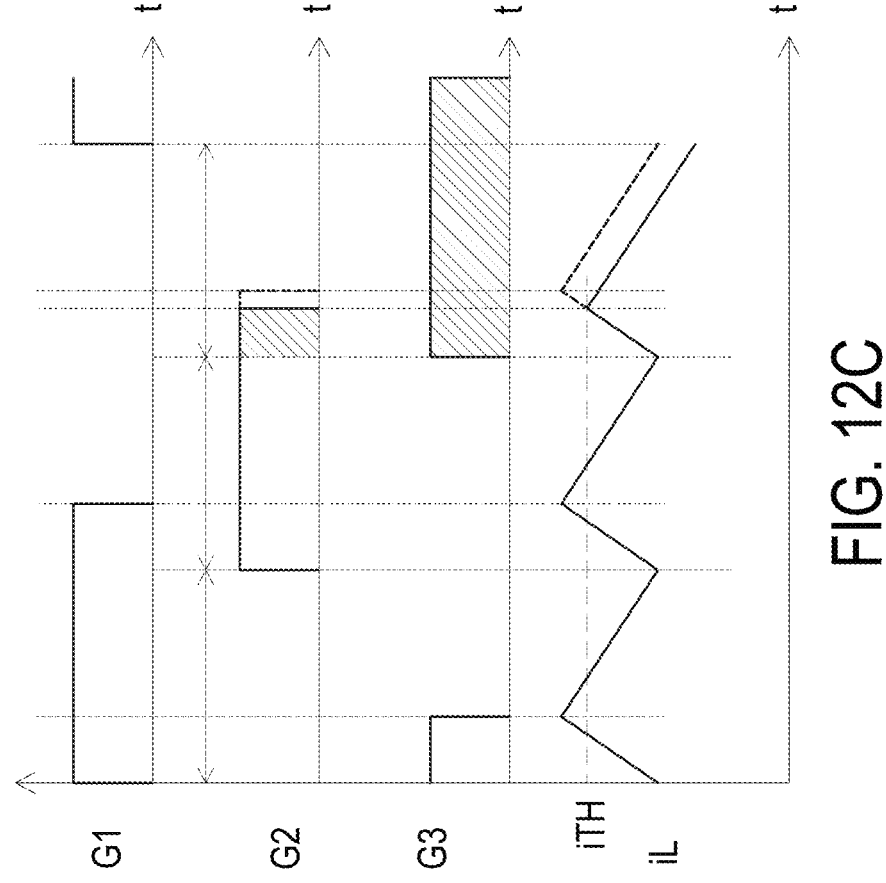

FIGS. 12A, 12B and 12C exemplify the waveforms of the main switches and the inductor current of the four-level conversion circuit performing the third cycle-by-cycle protection method, and the duty ratio of the main switches is greater than ⅓ and less than ⅔.

In FIG. 12A, when the current iL exceeds the threshold iTH, the main switch Sm3 in the on state and having the longest turn-on duration is switched to the current limiting mode so as to turn off the main switch Sm3 and reduce the current iL. After the current iL is lower than the threshold iTH, the main switch Sm3 is switched to the corresponding state of the reference mode at the moment that the control signal G3 of the main switch Sm3 firstly appears the rising edge in the reference mode. At this moment, the main switch Sm3 is turned on.

In FIG. 12B, when the current iL exceeds the threshold iTH, the main switch Sm1 in the on state and having the longest turn-on duration is switched to the current limiting mode so as to turn off the main switch Sm1 and reduce the current iL. After the current iL is lower than the threshold iTH, the main switch Sm1 is switched to the corresponding state of the reference mode at the moment that the control signal G1 of the main switch Sm1 firstly appears the rising edge in the reference mode. At this moment, the main switch Sm1 is turned on.

In FIG. 12C, when the current iL exceeds the threshold iTH, the main switch Sm2 in the on state and having the longest turn-on duration is switched to the current limiting mode so as to turn off the main switch Sm2 and reduce the current iL. After the current iL is lower than the threshold iTH, the main switch Sm2 is switched to the corresponding state of the reference mode at the moment that the control signal G2 of the main switch Sm2 firstly appears the rising edge in the reference mode. At this moment, the main switch Sm2 is turned on.

Figure 13A:
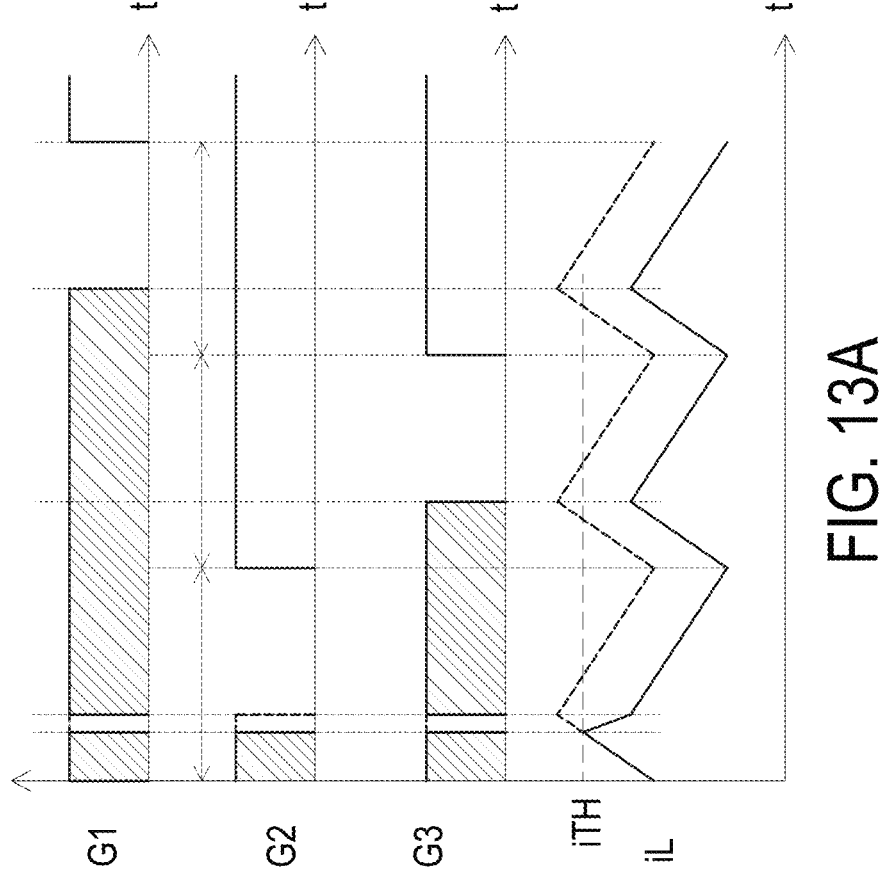
FIGS. 13A, 13B and 13C exemplify the waveforms of main switches and an inductor current of the four-level conversion circuit performing the first cycle-by-cycle protection method, and a duty ratio of the main switches is greater than 2/3.
Figure 13B:
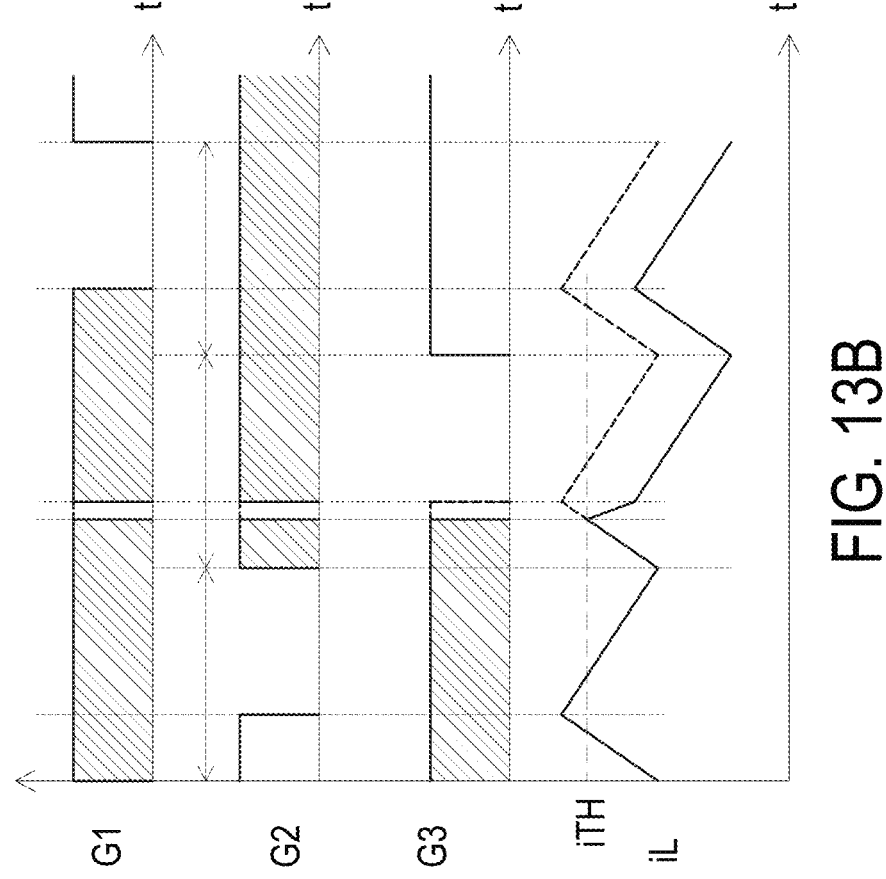
Figure 13C:
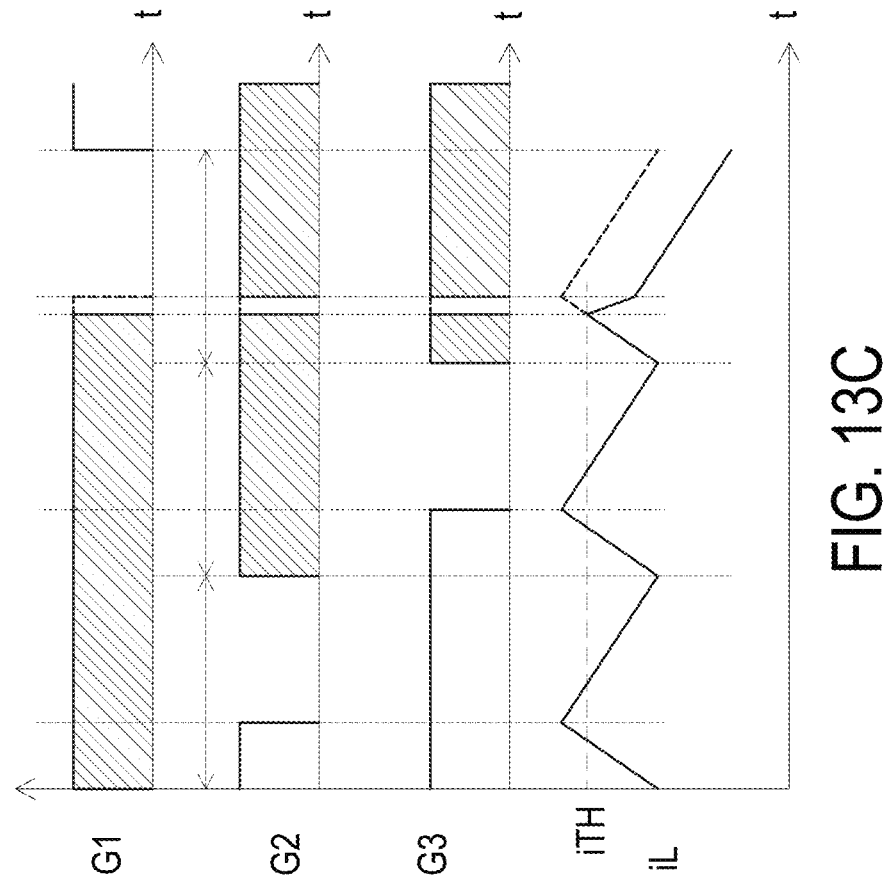

FIGS. 13A, 13B and 13C exemplify the waveforms of the main switches and the inductor current of the four-level conversion circuit performing the first cycle-by-cycle protection method, and the duty ratio of the main switches is greater than ⅔.

In FIG. 13A, when the current iL exceeds the threshold iTH, the main switches Sm1, Sm2 and Sm3 in the on state are switched to the current limiting mode so as to turn off the main switches Sm1, Sm2 and Sm3 and reduce the current iL. After the current iL is lower than the threshold iTH, the main switches Sm1, Sm2 and Sm3 are switched to the corresponding state of the reference mode at the moment that the control signals G1, G2 and G3 of all the main switches Sm1, Sm2 and Sm3 firstly appear the falling edge in the reference mode (i.e., at the falling edge of the control signal G2 of the main switch Sm2 in the reference mode). At this moment, the main switch Sm1 is turned on, the main switch Sm2 is maintained in the off state, and the main switch Sm3 is turned on.

In FIG. 13B, when the current iL exceeds the threshold iTH, the main switches Sm1, Sm2 and Sm3 in the on state are switched to the current limiting mode so as to turn off the main switches Sm1, Sm2 and Sm3 and reduce the current iL. After the current iL is lower than the threshold iTH, the main switches Sm1, Sm2 and Sm3 are switched to the corresponding state of the reference mode at the moment that the control signals G1, G2 and G3 of all the main switches Sm1, Sm2 and Sm3 firstly appear the falling edge in the reference mode (i.e., at the falling edge of the control signal G3 of the main switch Sm3 in the reference mode). At this moment, the main switch Sm1 is turned on, the main switch Sm2 is turned on, and the main switch Sm3 is maintained in the off state.

In FIG. 13C, when the current iL exceeds the threshold iTH, the main switches Sm1, Sm2 and Sm3 in the on state are switched to the current limiting mode so as to turn off the main switches Sm1, Sm2 and Sm3 and reduce the current iL. After the current iL is lower than the threshold iTH, the main switches Sm1, Sm2 and Sm3 are switched to the corresponding state of the reference mode at the moment that the control signals G1, G2 and G3 of all the main switches Sm1, Sm2 and Sm3 firstly appear the falling edge in the reference mode (i.e., at the falling edge of the control signal G1 of the main switch Sm1 in the reference mode). At this moment, the main switch Sm1 is maintained in the off state, the main switch Sm2 is turned on, and the main switch Sm3 is turned on.

Figure 14A:
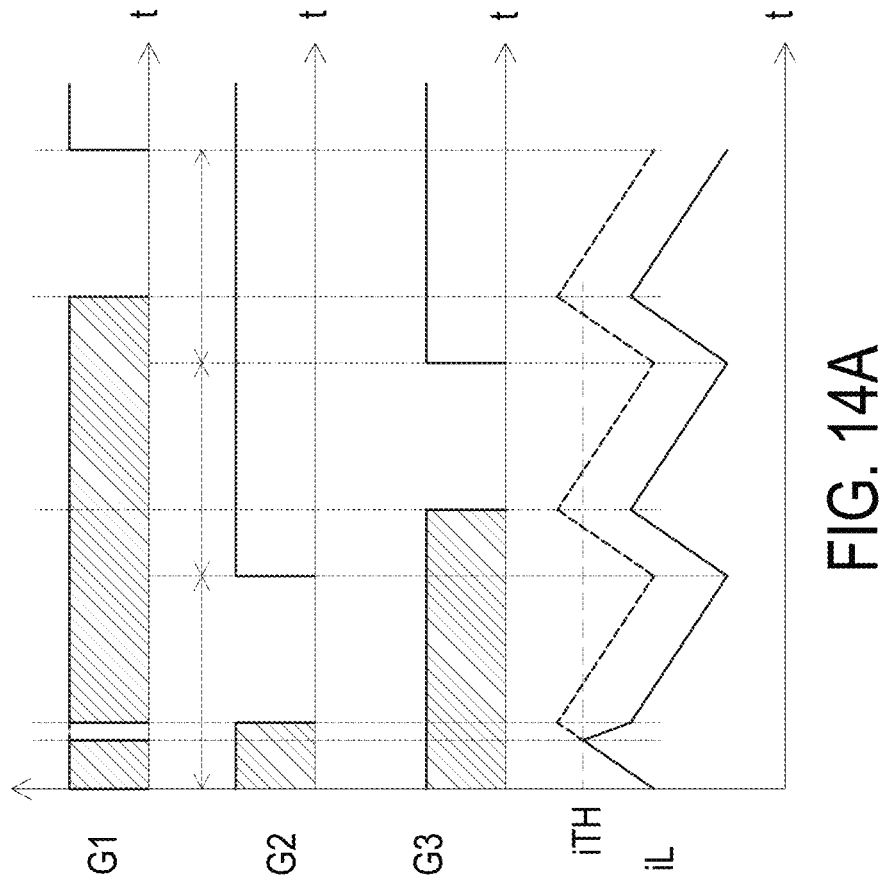
FIGS. 14A, 14B and 14C exemplify the waveforms of main switches and an inductor current of the four-level conversion circuit performing the second cycle-by-cycle protection method, and a duty ratio of the main switches is greater than 2/3.
Figure 14B:
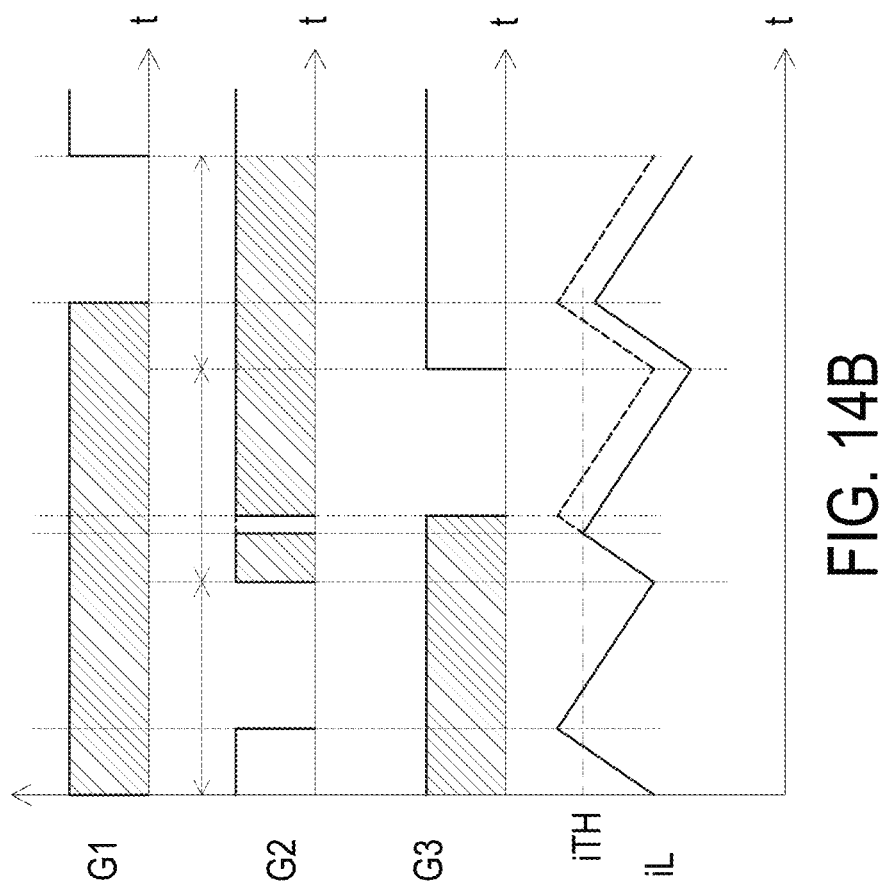
Figure 14C:
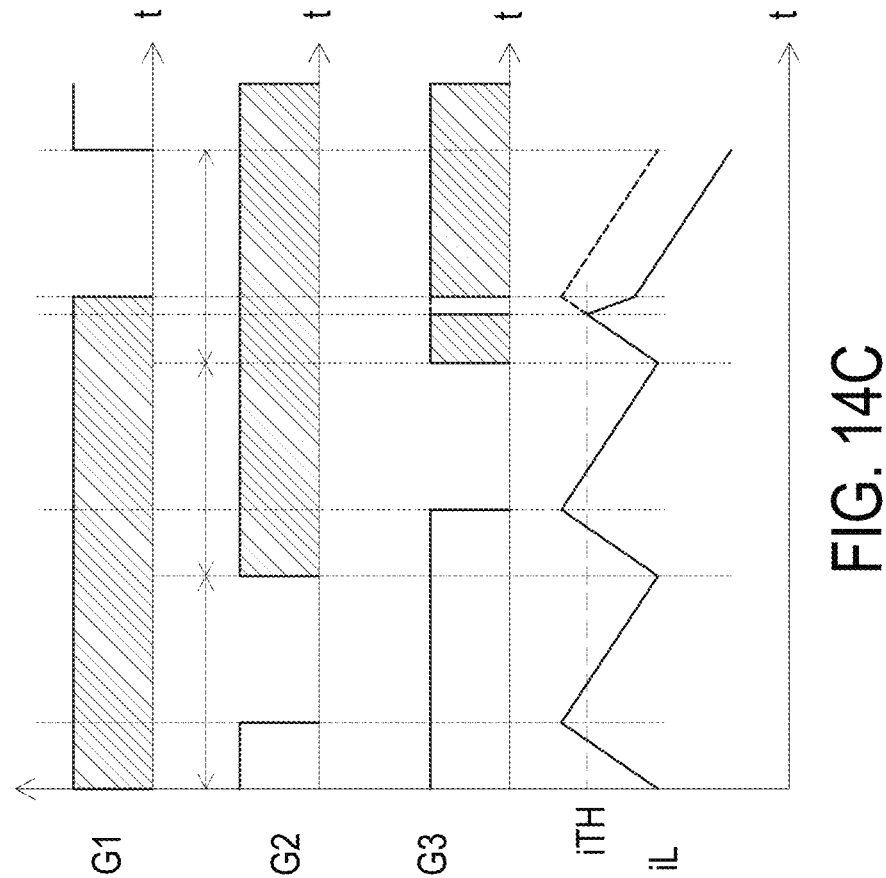

FIGS. 14A, 14B and 14C exemplify the waveforms of the main switches and the inductor current of the four-level conversion circuit performing the second cycle-by-cycle protection method, and the duty ratio of the main switches is greater than ⅔.

In FIG. 14A, when the current iL exceeds the threshold iTH, the main switch Sm1 in the on state and having the shortest turn-on duration is switched to the current limiting mode so as to turn off the main switch Sm1 and reduce the current iL. After the current iL is lower than the threshold iTH, the main switch Sm1 is switched to the corresponding state of the reference mode at the moment that the control signals G1, G2 and G3 of all the main switches Sm1, Sm2 and Sm3 firstly appear the falling edge in the reference mode (i.e., at the falling edge of the control signal G2 of the main switch Sm2 in the reference mode). At this moment, the main switch Sm1 is turned on.

In FIG. 14B, when the current iL exceeds the threshold iTH, the main switch Sm2 in the on state and having the shortest turn-on duration is switched to the current limiting mode so as to turn off the main switch Sm2 and reduce the current iL. After the current iL is lower than the threshold iTH, the main switch Sm2 is switched to the corresponding state of the reference mode at the moment that the control signals G1, G2 and G3 of all the main switches Sm1, Sm2 and Sm3 firstly appear the falling edge in the reference mode (i.e., at the falling edge of the control signal G3 of the main switch Sm3 in the reference mode). At this moment, the main switch Sm2 is turned on.

In FIG. 14C, when the current iL exceeds the threshold iTH, the main switch Sm3 in the on state and having the shortest turn-on duration is switched to the current limiting mode so as to turn off the main switch Sm3 and reduce the current iL. After the current iL is lower than the threshold iTH, the main switch Sm3 is switched to the corresponding state of the reference mode at the moment that the control signals G1, G2 and G3 of all the main switches Sm1, Sm2 and Sm3 firstly appear the falling edge in the reference mode (i.e., at the falling edge of the control signal G1 of the main switch Sm1 in the reference mode). At this moment, the main switch Sm3 is turned on.

Figure 15A:
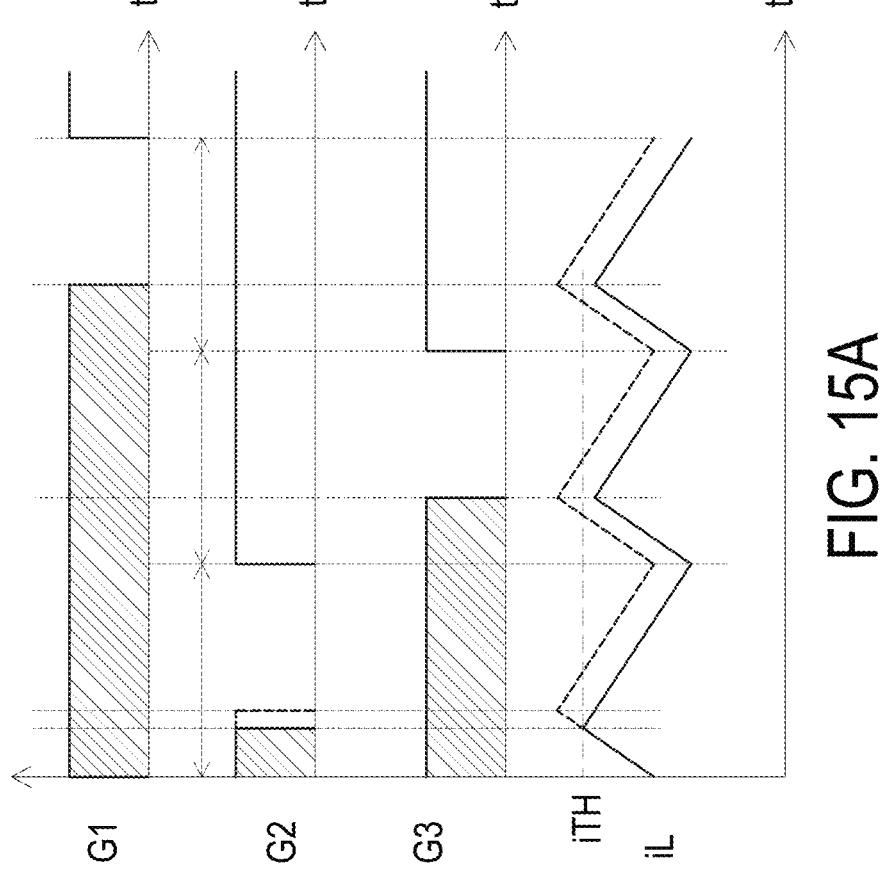
FIGS. 15A, 15B and 15C exemplify the waveforms of main switches and an inductor current of the four-level conversion circuit performing the third cycle-by-cycle protection method, and a duty ratio of the main switches is greater than 2/3.
Figure 15B:
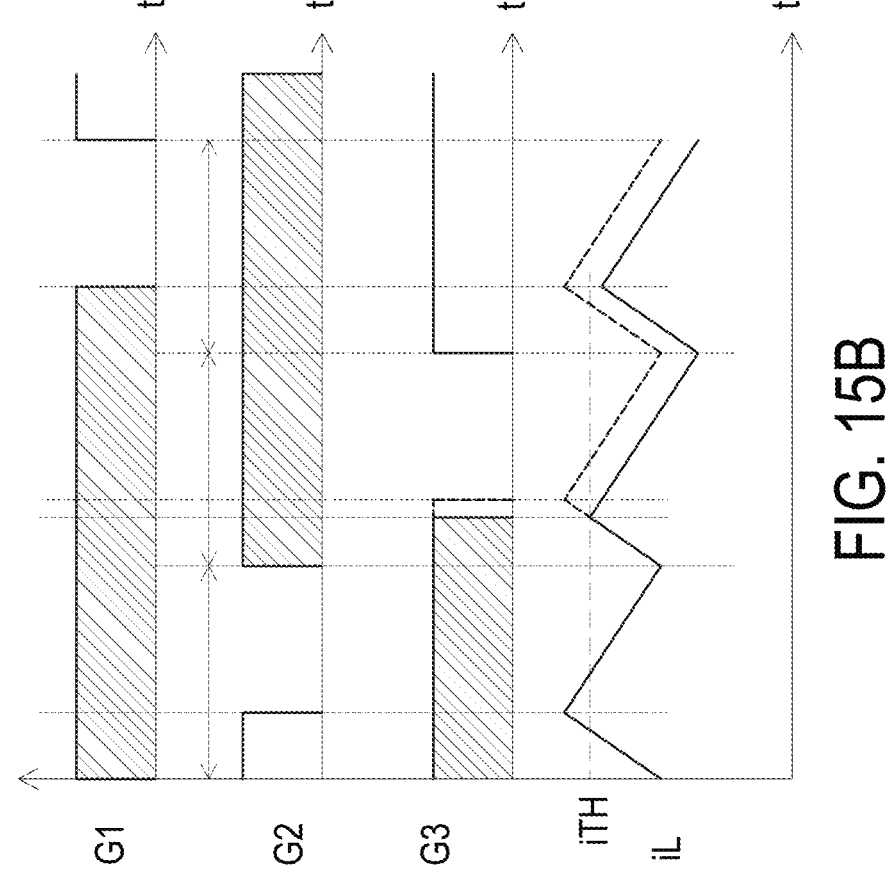
Figure 15C:
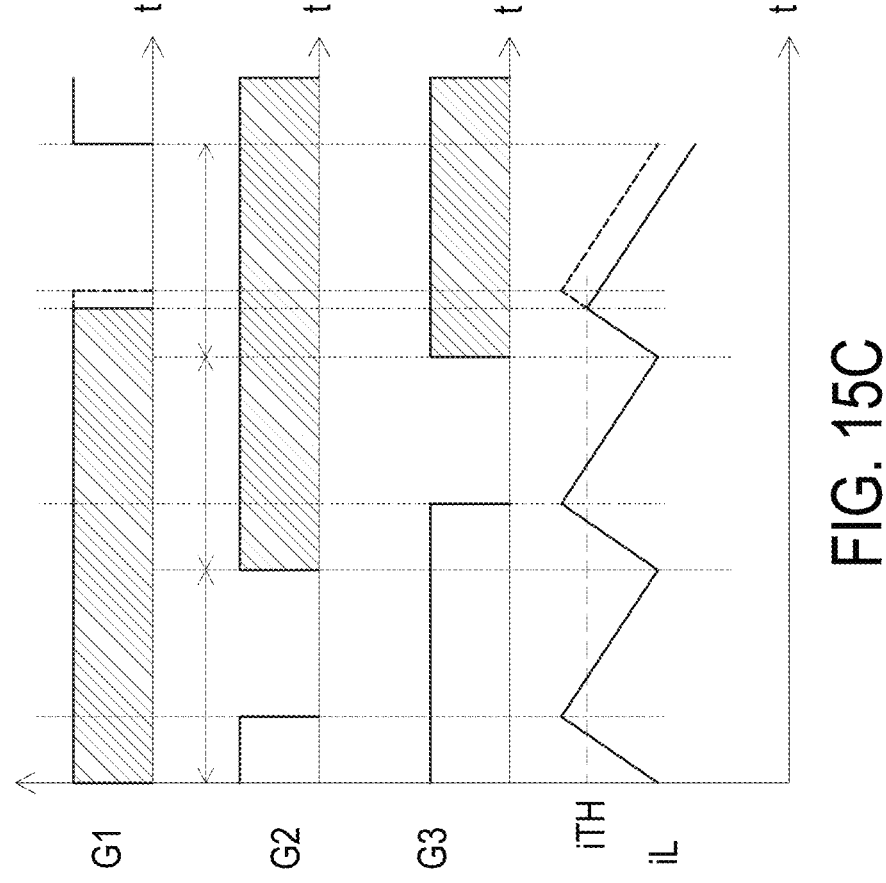

FIGS. 15A, 15B and 15C exemplify the waveforms of the main switches and the inductor current of the four-level conversion circuit performing the third cycle-by-cycle protection method, and the duty ratio of the main switches is greater than ⅔.

In FIG. 15A, when the current iL exceeds the threshold iTH, the main switch Sm2 in the on state and having the longest turn-on duration is switched to the current limiting mode so as to turn off the main switch Sm2 and reduce the current iL. After the current iL is lower than the threshold iTH, the main switch Sm2 is switched to the corresponding state of the reference mode at the moment that the control signal G2 of the main switch Sm2 firstly appears the rising edge in the reference mode. At this moment, the main switch Sm2 is turned on.

In FIG. 15B, when the current iL exceeds the threshold iTH, the main switch Sm3 in the on state and having the longest turn-on duration is switched to the current limiting mode so as to turn off the main switch Sm3 and reduce the current iL. After the current iL is lower than the threshold iTH, the main switch Sm3 is switched to the corresponding state of the reference mode at the moment that the control signal G3 of the main switch Sm3 firstly appears the rising edge in the reference mode. At this moment, the main switch Sm3 is turned on.

In FIG. 15C, when the current iL exceeds the threshold iTH, the main switch Sm1 in the on state and having the longest turn-on duration is switched to the current limiting mode so as to turn off the main switch Sm1 and reduce the current iL. After the current iL is lower than the threshold iTH, the main switch Sm1 is switched to the corresponding state of the reference mode at the moment that the control signal G1 of the main switch Sm1 firstly appears the rising edge in the reference mode. At this moment, the main switch Sm1 is turned on.

In summary, the present disclosure provides a multi-level conversion circuit and a cycle-by-cycle protection method therefor in which the inductor current is maintained to not exceed a threshold and the excessive fluctuation in the inductor current is avoided at the same time.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cycle-by-cycle protection method for a multi-level conversion circuit, wherein the number of levels of the multi-level conversion circuit equals N which is an integer greater than or equal to 3, the multi-level conversion circuit comprises a first input terminal, a second input terminal, a first output terminal, a second output terminal, an inductor, N−1 lower switches, N−1 upper switches and N−2 flying capacitors, the first input terminal and the second input terminal are configured to receive an input voltage, the first output terminal and the second output terminal are configured to provide an output voltage, the first input terminal is electrically connected to the second output terminal when a potential at the first input terminal is lower than a potential at the second input terminal, and the first input terminal is electrically connected to the first output terminal when the potential at the first input terminal is higher than the potential at the second input terminal;

a first terminal of the inductor is electrically connected to the second input terminal, the N−1 lower switches are electrically connected in series between a second terminal of the inductor and the second output terminal, the first lower switch and the N−1$^{th}$ lower switch are electrically coupled to the second terminal of the inductor and the second output terminal respectively, the N−1 upper switches are electrically connected in series between the second terminal of the inductor and the first output terminal, the first upper switch and the N−1$^{th}$ upper switch are electrically coupled to the second terminal of the inductor and the first output terminal respectively, the k$^{th}$ flying capacitor is connected between a common connection node of the k$^{th}$ lower switch and the k+1$^{th}$ lower switch and a common connection node of the k$^{th}$ upper switch and the k+1$^{th}$ upper switch, k is a positive integer less than or equal to N−2, and the cycle-by-cycle protection method comprises steps of:

(a) when the potential at the first input terminal is lower than the potential at the second input terminal, operating the N−1 lower switches and the N−1 upper switches as N−1 main switches and N−1 synchronous rectification switches respectively, and when the potential at the first input terminal is higher than the potential at the second input terminal, operating the N−1 lower switches and the N−1 upper switches as N−1 synchronous rectification switches and N−1 main switches respectively;

(b) controlling the N−1 main switches to operate in a normal mode, wherein in the normal mode, control signals of the $i^{th}$ lower switch and the $i^{th}$ upper switch are complementary, and i is a positive integer less than or equal to N−1;

(c) detecting a current flowing through the inductor, and determining whether the current exceeds a threshold;

(d) if a duty ratio of the N−1 main switches is greater than 1/(N−1), when the current exceeds the threshold, defining the main switch in an on state among the N−1 main switches as a target main switch, switching the target main switch to a current limiting mode for turning off the target main switch, and controlling the other main switches to maintain in the normal mode; and (e) after the target main switch is switched to the current limiting mode, if the current is lower than the threshold, at a moment when a falling edge of control signals in a reference mode for the N−1 main switches first appears, switching the target main switch to a state in the reference mode corresponding to the moment, wherein the reference mode is a mode where the N−1 main switches do not enter the current limiting mode and continuously operate in the normal mode.

2. The cycle-by-cycle protection method according to claim 1, wherein the multi-level conversion circuit further comprises a first input switch and a second input switch, the first input switch is electrically coupled between the first input terminal and the first output terminal, the second input switch is electrically coupled between the first input terminal and the second output terminal, and the cycle-by-cycle protection method further comprises:

when the potential at the first input terminal is lower than the potential at the second input terminal, turning off the first input switch, and turning on the second input switch; and when the potential at the first input terminal is higher than the potential at the second input terminal, turning on the first input switch, and turning off the second input switch.

3. The cycle-by-cycle protection method according to claim 1, wherein the input voltage is a DC voltage, the potential at the first input terminal is lower than the potential at the second input terminal, and the first input terminal is connected to the second output terminal.

4. The cycle-by-cycle protection method according to claim 1, wherein the input voltage is a DC voltage, the potential at the first input terminal is higher than the potential at the second input terminal, and the first input terminal is connected to the first output terminal.

5. The cycle-by-cycle protection method according to claim 1, wherein the input voltage is an AC voltage, when the input voltage is in a positive half cycle, the potential at the first input terminal is lower than the potential at the second input terminal, and when the input voltage is in a negative half cycle, the potential at the first input terminal is higher than the potential at the second input terminal.

6. A multi-level conversion circuit, having the number of levels equal to N which is an integer greater than or equal to 3, and comprising:

a first input terminal and a second input terminal, configured to receive an input voltage;

a first output terminal and a second output terminal, configured to provide an output voltage, wherein when a potential at the first input terminal is lower than a potential at the second input terminal, the first input terminal is electrically connected to the second output terminal, and when the potential at the first input terminal is higher than the potential at the second input terminal, the first input terminal is electrically connected to the first output terminal;

an inductor, having a first terminal electrically connected to the second input terminal;

N−1 lower switches, electrically connected in series between a second terminal of the inductor and the second output terminal, wherein the first lower switch and the $N-1^{th}$ lower switch are electrically coupled to the second terminal of the inductor and the second output terminal respectively;

N−1 upper switches, electrically connected in series between the second terminal of the inductor and the first output terminal, wherein the first upper switch and the $N-1^{th}$ upper switch are electrically coupled to the second terminal of the inductor and the first output terminal respectively;

N−2 flying capacitors, wherein the $k^{th}$ flying capacitor is connected between a common connection node of the $k^{th}$ lower switch and the $k+1^{th}$ lower switch and a common connection node of the $k^{th}$ upper switch and the $k+1^{th}$ upper switch, and k is a positive integer less than or equal to N−2; and a controller, configured to:

when the potential at the first input terminal is lower than the potential at the second input terminal, operate the N−1 lower switches and the N−1 upper switches as N−1 main switches and N−1 synchronous rectification switches respectively, and when the potential at the first input terminal is higher than the potential at the second input terminal, operate the N−1 lower switches and the N−1 upper switches as N−1 synchronous rectification switches and N−1 main switches respectively;

control the N−1 main switches to operate in a normal mode, wherein in the normal mode, control signals of the $i^{th}$ lower switch and the $i^{th}$ upper switch are complementary, and i is a positive integer less than or equal to N−1;

detect a current flowing through the inductor, and determine whether the current exceeds a threshold;

if a duty ratio of the N−1 main switches is greater than 1/(N−1), when the current exceeds the threshold, define the main switch in an on state among the N−1 main switches as a target main switch, switch the target main switch to a current limiting mode for turning off the target main switch, and control the other main switches to maintain in the normal mode; and after the target main switch is switched to the current limiting mode, if the current is lower than the threshold, at a moment when a falling edge of control signals in a reference mode for the N−1 main switches first appears, switch the target main switch to a state in the reference mode corresponding to the moment, wherein the reference mode is a mode where the N−1 main switches do not enter the current limiting mode and continuously operate in the normal mode.

7. The multi-level conversion circuit according to claim 6, further comprising a first input switch and a second input switch, wherein the first input switch is electrically coupled between the first input terminal and the first output terminal, the second input switch is electrically coupled between the first input terminal and the second output terminal, the controller turns off the first input switch and turns on the second input switch when the potential at the first input terminal is lower than the potential at the second input terminal, and the controller turns on the first input switch and turns off the second input switch when the potential at the first input terminal is higher than the potential at the second input terminal.

8. The multi-level conversion circuit according to claim 6, wherein the input voltage is a DC voltage, the potential at the first input terminal is lower than the potential at the second input terminal, and the first input terminal is connected to the second output terminal.

9. The multi-level conversion circuit according to claim 6, wherein the input voltage is a DC voltage, the potential at the first input terminal is higher than the potential at the second input terminal, and the first input terminal is connected to the first output terminal.

10. The multi-level conversion circuit according to claim 6, wherein the input voltage is an AC voltage, when the input voltage is in a positive half cycle, the potential at the first input terminal is lower than the potential at the second input terminal, and when the input voltage is in a negative half cycle, the potential at the first input terminal is higher than the potential at the second input terminal.

* * * * *